United States Patent
Eguchi et al.

(10) Patent No.: US 10,116,923 B2
(45) Date of Patent: Oct. 30, 2018

(54) IMAGE PROCESSING APPARATUS, IMAGE PICKUP APPARATUS, IMAGE PROCESSING METHOD, AND NON-TRANSITORY COMPUTER-READABLE STORAGE MEDIUM FOR IMPROVING QUALITY OF IMAGE

(71) Applicant: CANON KABUSHIKI KAISHA, Tokyo (JP)

(72) Inventors: Kaoru Eguchi, Utsunomiya (JP); Chiaki Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/054,597

(22) Filed: Feb. 26, 2016

(65) Prior Publication Data

US 2016/0261849 A1    Sep. 8, 2016

(30) Foreign Application Priority Data

Mar. 2, 2015    (JP) .................................. 2015-039964

(51) Int. Cl.
*H04N 13/225* (2018.01)
*H04N 5/357* (2011.01)
(Continued)

(52) U.S. Cl.
CPC ......... *H04N 13/225* (2018.05); *H04N 5/2171* (2013.01); *H04N 5/3572* (2013.01); *H04N 13/0018* (2013.01); *H04N 13/0217* (2013.01); *H04N 13/0228* (2013.01); *H04N 5/23212* (2013.01)

(58) Field of Classification Search
CPC combination set(s) only.
See application file for complete search history.

(56) References Cited

U.S. PATENT DOCUMENTS 8,345,144 B1    1/2013    Georgiev et al.
8,619,082 B1    12/2013    Ciurea et al.
(Continued)

FOREIGN PATENT DOCUMENTS

CN    102972032 A    3/2013
EP      2180362 A1    4/2010
(Continued)

OTHER PUBLICATIONS

NG, et al., "Light Field Photography with a Hand-held Plenoptic Camera", Stanford Tech Report CTSR, pp. 1-11, Feb. 2005.
(Continued)

*Primary Examiner* — Tsung-Yin Tsai
(74) *Attorney, Agent, or Firm* — Rossi, Kimms & McDowell LLP

(57) ABSTRACT

An image processing apparatus (204) includes a generator (204a) which generates difference information relating to a plurality of parallax images, a gain distribution determiner (204b) which determines a gain distribution based on the difference information, an intensity determiner (204c) which determines an unnecessary component intensity based on the gain distribution, and a reducer (204d) which generates an unnecessary component reduction image in which an unnecessary component is reduced based on the parallax image and the unnecessary component intensity.

20 Claims, 17 Drawing Sheets

(51) Int. Cl.
  *H04N 13/00* (2018.01)
  *H04N 13/02* (2006.01)
  *H04N 5/217* (2011.01)
  *H04N 5/232* (2006.01)

(56) References Cited

U.S. PATENT DOCUMENTS

| | | | |
|---|---|---|---|
| 2001/0036302 A1 | 11/2001 | Miller | |
| 2002/0056808 A1* | 5/2002 | Tsuneta | H01J 37/21 250/306 |
| 2003/0164935 A1 | 9/2003 | Kanemitsu | |
| 2006/0029272 A1* | 2/2006 | Ogawa | G06K 9/32 382/154 |
| 2009/0046924 A1* | 2/2009 | Morimitsu | G01C 11/06 382/154 |
| 2011/0019184 A1* | 1/2011 | Iwane | G02B 7/36 356/123 |
| 2011/0150357 A1 | 6/2011 | Prentice | |
| 2011/0216975 A1 | 9/2011 | Rother et al. | |
| 2011/0279653 A1* | 11/2011 | Hoshino | G03B 35/02 348/47 |
| 2012/0113222 A1* | 5/2012 | Hata | H04N 13/0018 348/43 |
| 2012/0154551 A1* | 6/2012 | Inoue | H04N 13/128 348/49 |
| 2012/0314103 A1 | 12/2012 | Majewicz et al. | |
| 2013/0002911 A1* | 1/2013 | Miyashita | H04N 5/23212 348/247 |
| 2013/0113892 A1* | 5/2013 | Nakamaru | G03B 35/18 348/47 |
| 2013/0120614 A1 | 5/2013 | Oyama | |
| 2013/0194387 A1* | 8/2013 | Hatakeyama | H04N 5/3572 348/46 |
| 2015/0005659 A1 | 1/2015 | Masumoto | |
| 2015/0264333 A1* | 9/2015 | Ishiga | H01L 27/14623 382/154 |
| 2016/0093029 A1 | 3/2016 | Micovic et al. | |

FOREIGN PATENT DOCUMENTS

| | | |
|---|---|---|
| JP | 2008054206 A | 3/2008 |
| JP | 2011205531 A | 10/2011 |

OTHER PUBLICATIONS

Lumsdaine, et al., "Full Resolution Lightfield Rendering", Adobe Technical Report, Jan. 2008, pp. 1-12.
Office Action issued in U.S. Appl. No. 15/054,419 dated Aug. 18, 2017.
Office Action issued in U.S. Appl. No. 15/054,419 dated Feb. 22, 2018.
Office Action issued in Chinese Appln. No. 201610112223.6 dated Dec. 25, 2017. English translation provided.
Notice of Allowance issued in U.S. Appl. No. 15/054,419 dated May 18, 2018.

* cited by examiner

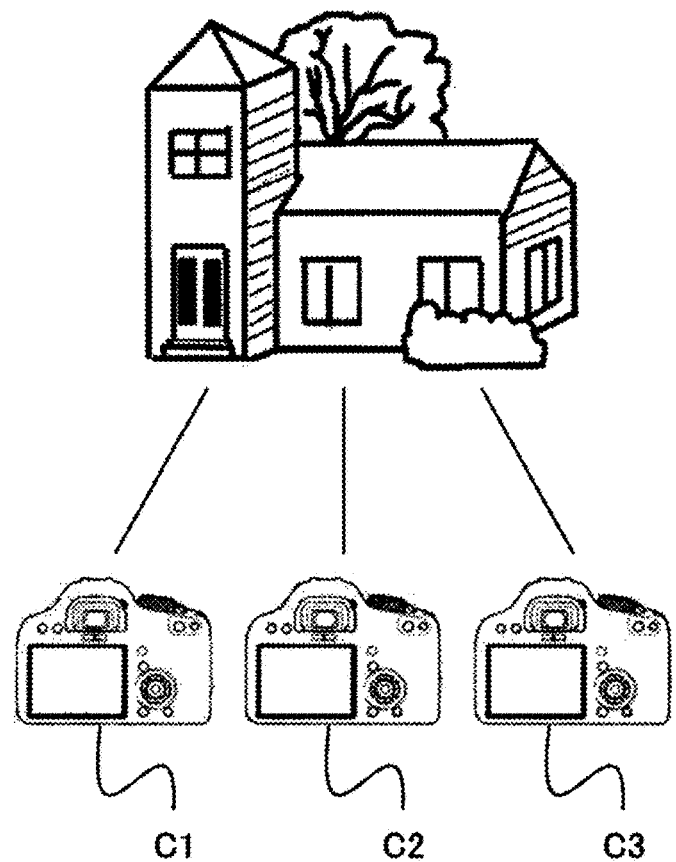
FIG. 25
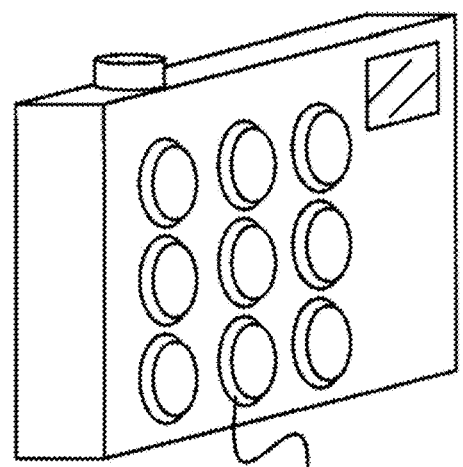
FIG. 26  OSj

IMAGE PROCESSING APPARATUS, IMAGE PICKUP APPARATUS, IMAGE PROCESSING METHOD, AND NON-TRANSITORY COMPUTER-READABLE STORAGE MEDIUM FOR IMPROVING QUALITY OF IMAGE

BACKGROUND OF THE INVENTION

Field of the Invention

The present invention relates to an image processing method for improving a quality of a captured image.

Description of the Related Art

In image capturing through an image pickup apparatus such as a camera, part of light incident on an optical system may be reflected by a surface of a lens and a member holding the lens and arrive at an imaging plane as unnecessary light. This unnecessary light appears as an unnecessary component such as a ghost and a flare in a captured image. When a diffractive optical element is used in a telephoto lens to correct longitudinal (axial) chromatic aberration and chromatic aberration of magnification, light from a high intensity object such as the sun outside an angle of view for the image capturing may be incident on the diffractive optical element, generating unnecessary light as an unnecessary component over the entire image. Previously, a method of removing the unnecessary component by using digital image processing is known.

Japanese Patent Laid-open No. 2008-54206 discloses a method of detecting any ghost based on a difference image indicating a difference between an image (in-focus image) when an optical system is in focus on an object and an image (defocus image) when the image pickup optical system is out of focus. However, the method disclosed in Japanese Patent Laid-open No. 2008-54206 requires image capturing to be performed a plurality of times and thus is not suitable for still image pickup and moving image pickup of a moving object.

Japanese Patent Laid-open No. 2011-205531 discloses a method of detecting a ghost based on comparison of a plurality of parallax images captured by a single-lens stereoscopic image pickup. The method disclosed in Japanese Patent Laid-open No. 2011-205531, which obtains a plurality of parallax images by single image capturing, is applicable to still image pickup and moving image capturing of a moving object.

However, in the method disclosed in Japanese Patent Laid-open No. 2011-205531, an optical path for the ghost is displaced from an ideal pupil-divided optical path, and accordingly the ghost cannot be effectively reduced if the same ghost appears in both a main pixel and a subpixel while a luminance distribution is different.

SUMMARY OF THE INVENTION

The present invention provides an image processing apparatus, an image pickup apparatus, an image processing method, and a non-transitory computer-readable storage medium which are capable of effectively determining an intensity of an unnecessary component contained in a captured image without imaging a plurality of times to reduce the unnecessary component from the captured image.

An image processing apparatus as one aspect of the present invention includes a generator configured to generate difference information relating to a plurality of parallax images, a gain distribution determiner configured to determine a gain distribution based on the difference information, an intensity determiner configured to determine an unnecessary component intensity based on the gain distribution, and a reducer configured to generate an unnecessary component reduction image in which an unnecessary component is reduced based on the parallax image and the unnecessary component intensity.

An image pickup apparatus as another aspect of the present invention includes an image pickup device configured to photoelectrically convert an optical image formed via an optical system to output a plurality of parallax images, a determiner configured to determine difference information relating to the plurality of parallax images, a calculator configured to calculate a gain distribution based on the difference information, an intensity determiner configured to determine an unnecessary component intensity based on the gain distribution, and a reducer configured to generate an unnecessary component reduction image in which an unnecessary component is reduced based on the parallax image and the unnecessary component intensity.

An image processing method as another aspect of the present invention includes the steps of determining difference information relating to a plurality of parallax images, calculating a gain distribution based on the difference information, determining an unnecessary component intensity based on the gain distribution, and generating an unnecessary component reduction image in which an unnecessary component is reduced based on the parallax image and the unnecessary component intensity.

A non-transitory computer-readable storage medium as another aspect of the present invention stores a program causing a computer to execute a process including the steps of determining difference information relating to a plurality of parallax images, calculating a gain distribution based on the difference information, determining an unnecessary component intensity based on the gain distribution, and generating an unnecessary component reduction image in which an unnecessary component is reduced based on the parallax image and the unnecessary component intensity.

An image processing apparatus as another aspect of the present invention includes an unnecessary component determiner configured to generate difference information relating to a plurality of parallax images to determine an unnecessary component based on the difference information, a gain distribution determiner configured to determine a gain distribution based on the unnecessary component, and a reducer configured to generate an unnecessary component reduction image in which an unnecessary component is reduced based on the parallax image, the unnecessary component, and the gain distribution.

An image pickup apparatus as another aspect of the present invention includes an image pickup device configured to photoelectrically convert an optical image formed via an optical system to output a plurality of parallax images, an unnecessary component determiner configured to generate difference information relating to the plurality of parallax images to determine an unnecessary component based on the difference information, a gain distribution determiner configured to determine a gain distribution based on the unnecessary component, and a reducer configured to generate an unnecessary component reduction image in which an unnecessary component is reduced based on the parallax image, the unnecessary component, and the gain distribution.

An image processing method as another aspect of the present invention includes the steps of generating difference information relating to a plurality of parallax images to determine an unnecessary component based on the difference information, determining a gain distribution based on the unnecessary component, and generating an unnecessary component reduction image in which an unnecessary component is reduced based on the parallax image, the unnecessary component, and the gain distribution.

A non-transitory computer-readable storage medium as another aspect of the present invention stores a program causing a computer to execute a process including the steps of generating difference information relating to a plurality of parallax images to determine an unnecessary component based on the difference information, determining again distribution based on the unnecessary component, and generating an unnecessary component reduction image in which an unnecessary component is reduced based on the parallax image, the unnecessary component, and the gain distribution.

Further features and aspects of the present invention will become apparent from the following description of exemplary embodiments with reference to the attached drawings.

BRIEF DESCRIPTION OF THE DRAWINGS

FIG. 25 is a diagram of illustrating an example of an image pickup apparatus in Embodiment 4.

FIG. 26 is a diagram of illustrating an example of an image pickup apparatus in Embodiment 4.

DESCRIPTION OF THE EMBODIMENTS

Exemplary embodiments of the present invention will be described below with reference to the accompanied drawings.

In each embodiment, an image pickup apparatus capable of generating a plurality of parallax images includes an image pickup system that guides a plurality of light beams passing through regions of a pupil of an optical system (image pickup optical system) that are different from each other, to light-receiving portions (pixels) of an image pickup element that are different from each other and perform photoelectric conversions.

Embodiment 1

Figure 3:
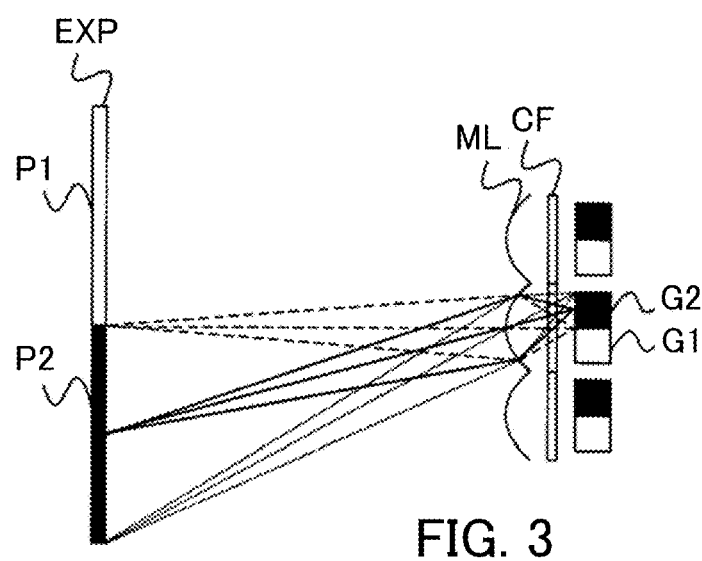
FIG. 3 is a relational diagram of a light-receiving portion of an image pickup element and a pupil of an optical system in an image pickup system in each of Embodiments 1 and 2.

First of all, Embodiment 1 of the present invention will be described. FIG. 3 illustrates a relation between light-receiving portions of an image pickup element in an image pickup system in this embodiment and a pupil of an optical system. In FIG. 3, symbol ML represents a micro lens, and symbol CF represents a color filter. Symbol EXP represents an exit pupil (the pupil) of the optical system, and symbols P1 and P2 represent regions of the exit pupil EXP. Symbols G1 and G2 represent pixels (light-receiving portions), and one pixel G1 and one pixel G2 make a pair (the pixels G1 and G2 are disposed to share a single micro lens ML). The image pickup element includes an array of a plurality of pairs (pixel pairs) of the pixels G1 and G2. The paired pixels G1 and G2 have a conjugate relation with the exit pupil EXP via the shared (that is, provided for each pixel pair) micro lens ML. In each embodiment, the pixels G1 and G2 arrayed in the image pickup element are also referred to as pixel groups G1 and G2, respectively.

Figure 4:
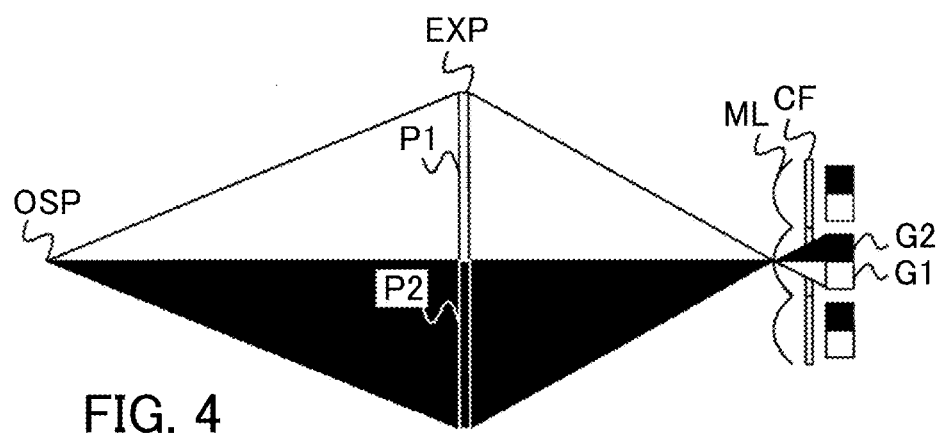
FIG. 4 is a schematic diagram of the image pickup system in each of Embodiments 1 and 2.

FIG. 4 is a schematic diagram of the image pickup system in this embodiment which is assumed to have a configuration in which instead of the micro lens ML illustrated in FIG. 3, a thin lens is provided at the position of the exit pupil EXP. The pixel G1 receives a light beam passing through a region P1 of the exit pupil EXP. The pixel G2 receives a light beam passing through a region P2 of the exit pupil EXP. Symbol OSP represents an object point for which image pickup (imaging or image capturing) is performed. The object point OSP does not necessarily need to have an object located thereon. A light beam passing through the object point OSP is incident on one of the pixel G1 and the pixel G2 depending on a position (the region P1 or the region P2 in this embodiment) in the pupil (exit pupil EXP) through which the light beam passes. Travelling of light beams through regions of the pupil that are different from each other corresponds to separation of incident light from the object point OSP by its angle (parallax). In other words, for each micro lens ML corresponding to the pixels G1 and G2, an image based on an output signal from the pixel G1 and an image based on an output signal from the pixel G2 are generated as a plurality of (in this example, a pair of) parallax images having parallaxes with each other. Hereinafter, reception of light beams passing through the regions of the pupil that are different from each other by the light-receiving portions (pixels) different from each other may be referred to as pupil division.

When the conjugate relation is not completely held due to, for example, a position shift of the exit pupil EXP illustrated in FIGS. 3 and 4, or when the regions P1 and P2 partially overlap with each other, a plurality of obtained images are still treated as parallax images in this embodiment. A minimum element that constitutes an image is called a pixel (pixel signal), which is distinguished from a pixel on the image pickup element, and each pixel represents a light intensity and color according to its numerical value. A value of each pixel is referred to as a pixel value. The pixel value is equal to a luminance value when the image is a monochrome image, and each embodiment in the present invention will describe the monochrome image for simplicity. Therefore, in each embodiment, the pixel value and the luminance value have the same meaning. When the image is an RGB color image, the same calculation can be performed for each color of the pixel values. This is true also in each of the following embodiments.

Figure 5:
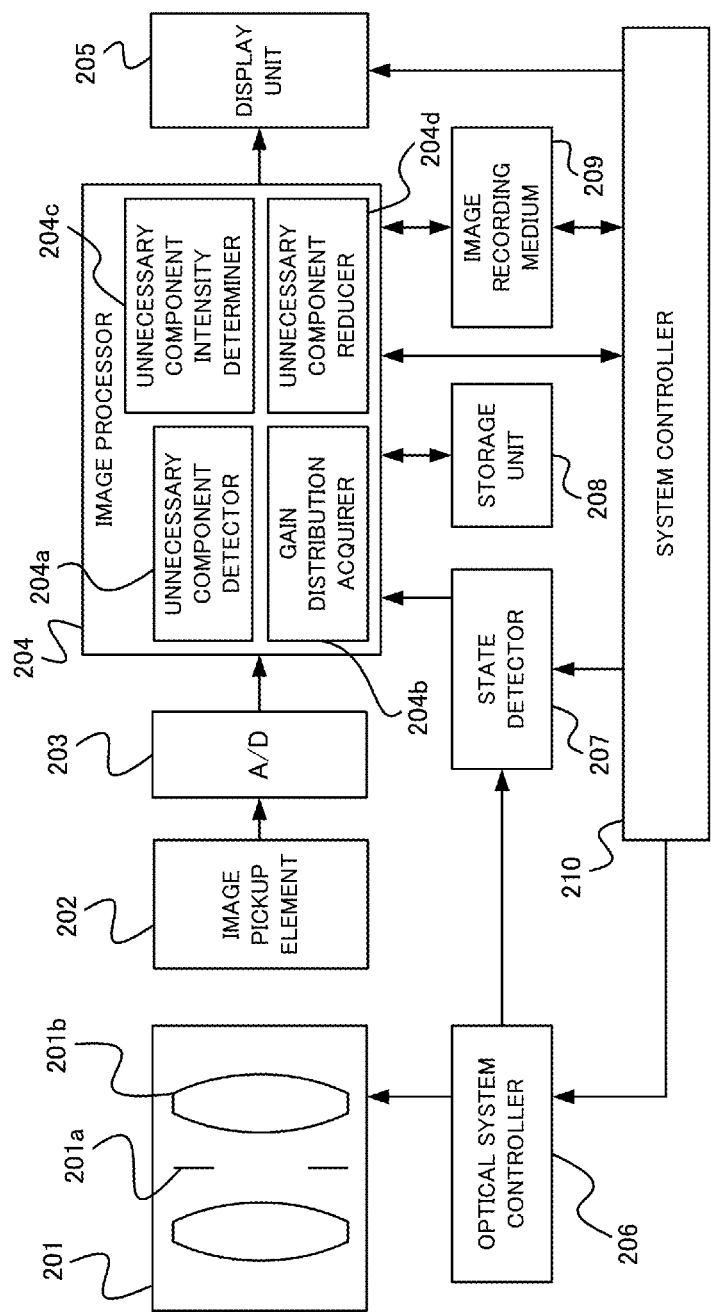
FIG. 5 is a block diagram of an image pickup apparatus in each embodiment.

Next, referring to FIG. 5, an image pickup apparatus that executes an image processing method in this embodiment will be described. FIG. 5 is a block diagram of illustrating a configuration of an image pickup apparatus 200 in this embodiment. An optical system 201 (image pickup optical system) includes an aperture stop 201a and a focus lens 201b, and causes light from an object (not illustrated) to be imaged (condensed) on an image pickup element 202. The image pickup element 202 includes a photoelectric conversion element such as a CCD sensor and a CMOS sensor, and receives light beams passing through regions of the pupil that are different from each other, through pixels (light-receiving portions) corresponding to the respective regions (performs the pupil division), as described referring to FIGS. 3 and 4. In this manner, the image pickup element 202 performs a photoelectric conversion on an object image (optical image) formed via the optical system 201 and outputs image signals (analog electric signals) as a plurality of parallax images. An A/D converter 203 converts the analog electric signals output from the image pickup element 202 into digital signals, and then outputs these digital signals to an image processor 204.

The image processor 204 performs typical image processing on the digital signals, and also performs determination processing of unnecessary light (unnecessary component) and correction processing to reduce or remove the unnecessary light. In this embodiment, the image processor 204 corresponds to an image processing apparatus incorporated in the image pickup apparatus 200. The image processor 204 includes an unnecessary component detector 204a (generator), a gain distribution acquirer 204b (gain distribution determiner), an unnecessary component intensity determiner 204c (intensity determiner), and an unnecessary component reducer 204d (reducer).

The unnecessary component detector 204a generates (acquires) parallax images and detects (determines) an unnecessary component based on the parallax images. The gain distribution acquirer 204b calculates a gain distribution in an image to determine an unnecessary component intensity at a subsequent stage. The unnecessary component intensity determiner 204c determines the unnecessary component intensity to be reduced based on the detected unnecessary component and the gain distribution. The unnecessary component reducer 204d reduces an unnecessary component from each parallax image depending on the unnecessary component intensity. In this embodiment, the parallax images can be output and generated as "an image formed only by the pixel group G1" and "an image formed by only by the pixel group G2" in a form previously separated into the two images. Alternatively, "an image formed only the pixel group G1" and "a synthesized image of the pixel groups G1 and G2" may be output first, and then an image formed only by the pixel group G1 may be subtracted from the synthesized image to calculate and obtain an image corresponding to the image formed only by the pixel group G2.

The output image (image data) processed by the image processor 204 is stored in an image recording medium 209 such as a semiconductor memory and an optical disk. The output image from the image processor 204 can be displayed on a display unit 205. A storage unit 208 (memory) stores an image processing program and various kinds of information needed for the image processing by the image processor 204.

A system controller 210 (controller, processor, or CPU) controls the operation of the image pickup element 202, the processing by the image processing unit 204, and the optical system 201 (the aperture stop 201a and the focus lens 201b). An optical system controller 206 performs mechanical drive of the aperture stop 201a and the focus lens 201b of the optical system 201 in response to a control instruction from the system controller 210. The aperture stop 201a has its opening diameter controlled in accordance with a set aperture value (F-number). The focus lens 201b has its position controlled by an autofocus (AF) system and a manual focus mechanism (not illustrated) to perform focusing (focus control) in accordance with an object distance. A state detector 207 acquires current image capturing condition information in response to a control instruction from the system controller 210. In this embodiment, the optical system 201 is included as part of the image pickup apparatus 200 (integrally with the image pickup apparatus 200) including the image pickup element 202, but is not limited thereto. Like a single-lens reflex camera, the image pickup system may include an interchangeable optical system (interchangeable lens) detachably attached to an image pickup apparatus body.

Figure 6A:
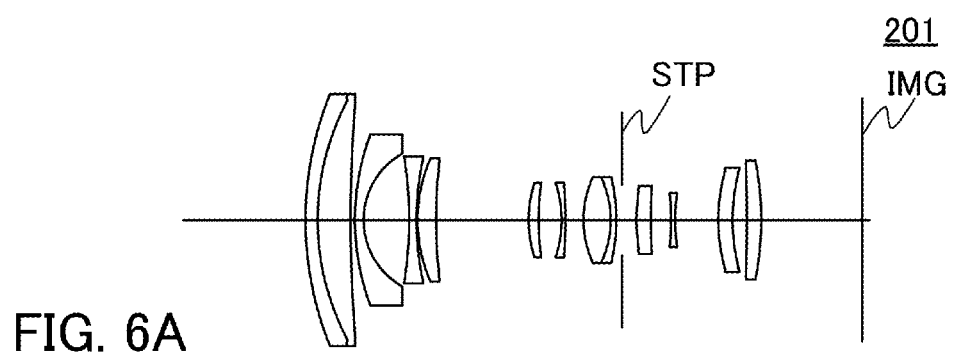
FIGS. 6A to 6C are diagrams of a configuration of the optical system and an explanatory diagram of unnecessary light occurring in the optical system each embodiment.
Figure 6B:
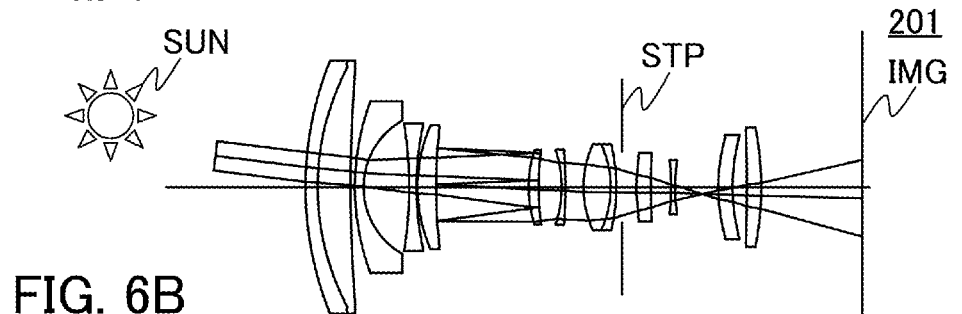
Figure 6C:
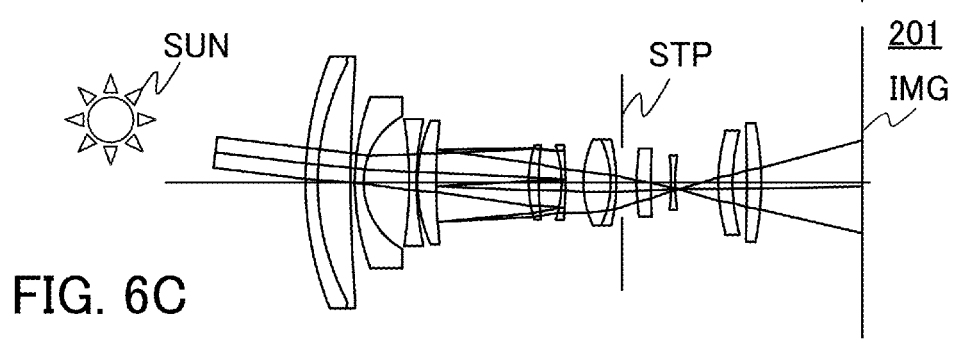

FIGS. 6A to 6C are a configuration diagram of the optical system 201 and explanatory diagrams of unnecessary light occurring in the optical system 201. FIG. 6A specifically illustrates an exemplary configuration of the optical system 201. In FIG. 6A, symbol STP represents an aperture stop (corresponding to the aperture stop 201a), and symbol IMG represents an imaging plane. The image pickup element 202 illustrated in FIG. 5 is disposed at the position of the imaging plane IMG. FIG. 6B illustrates a case in which strong light from the sun denoted with SUN as an exemplary high luminance object is incident on the optical system 201, and light reflected at a surface of a lens included in the optical system 201 arrives as an unnecessary component A (unnecessary light such as a ghost or a flare) at the imaging plane IMG. FIG. 6C illustrates a case in which strong light is incident similarly to FIG. 6B, and light reflected at a surface of a lens different from the surface by which the unnecessary component A is reflected arrives as an unnecessary component B (unnecessary light such as a ghost and a flare) at the imaging plane IMG.

Figure 7:
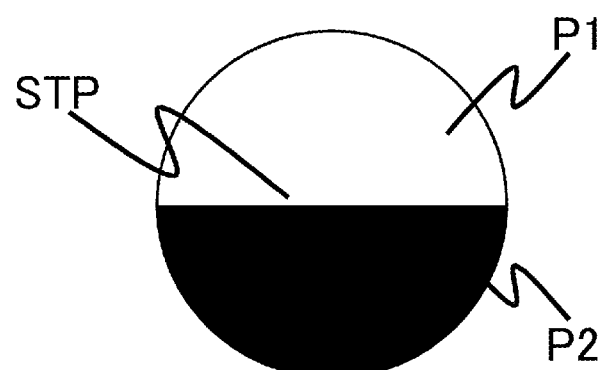
FIG. 7 is an explanatory diagram of unnecessary light passing through an aperture stop of the optical system in each of Embodiments 1 and 2.

FIG. 7 illustrates the regions P1 and P2 (pupil regions or pupil division regions) of the aperture stop STP, through which light beams incident on the pixels G1 and G2 illustrated in FIG. 4 pass. The aperture stop STP can be assumed to correspond to the exit pupil EXP (i.e., virtual image when seen from an image plane position of the optical system 201) of the optical system 201, but in practice, it is often the case that the aperture stop STP and the exit pupil EXP are different from each other. Although a light beam from the high luminance object (SUN) passes through an almost entire region of the aperture stop STP, a region through which the light beams to be incident on the pixels G1 and G2 pass is divided into the regions P1 and P2 (pupil regions). In the example illustrated in FIGS. 6B and 6C, the light beam from the high luminance object passes through a region approximately at the lower half of the aperture stop STP, and it is a situation in which part of the light beam passes through the region P1 and the remaining entire light beam passes through the region P2 referring to FIG. 4. The light beam passing through the region P1 is incident on the pixel G1, and the light beam passing through the region P2 is incident on the pixel G2.

Figure 1:
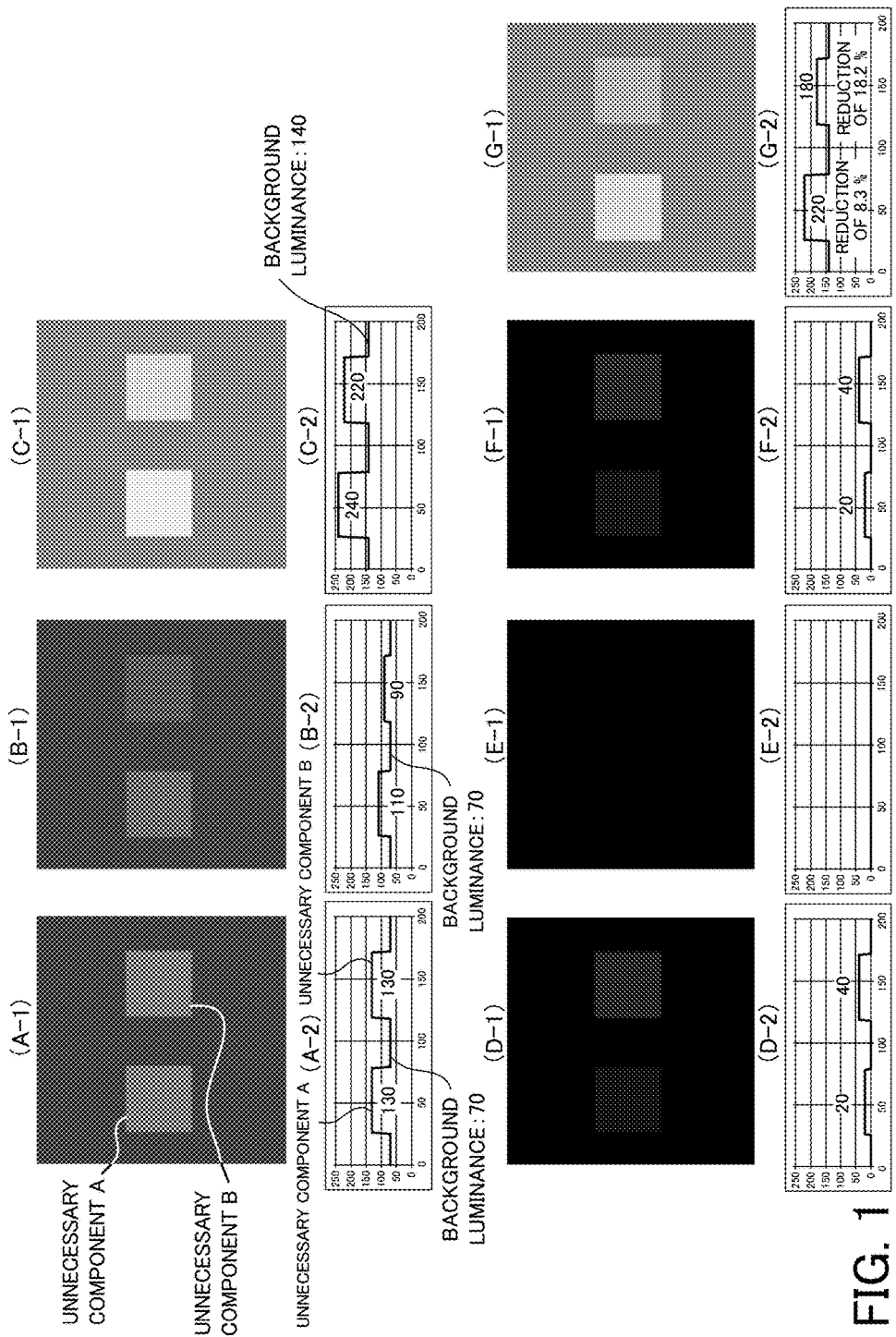
FIG. 1 is a diagram of illustrating a procedure of an image processing method in each of Embodiments 1 and 2.
Figure 2:
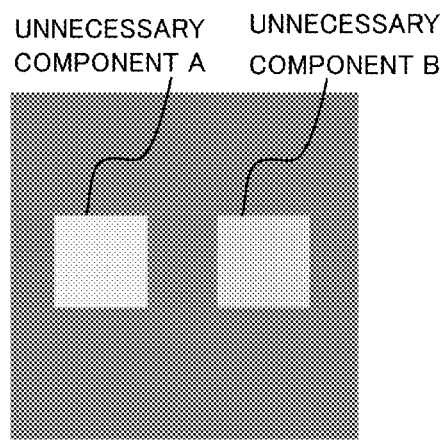
FIG. 2 is an exemplary output image obtained by the image processing method in each of Embodiments 1 and 2.

Next, referring to FIGS. 1 and 2, a method of determining an unnecessary component as an image component that appears through a photoelectric conversion of unnecessary light in a captured image generated by the image pickup apparatus 200 will be described. FIG. 1 is a diagram of illustrating a procedure of the image processing method in this embodiment. FIG. 2 is an example of an output image obtained by the image processing method in this embodiment. When an image is captured by using the optical system 201 illustrated in FIG. 6A, an unnecessary component A that occurs in the optical path of FIG. 6B and an unnecessary component B that occurs in the optical path of FIG. 6C overlap with each other. However, in FIGS. 1 and 2, for simplifying descriptions, the unnecessary components A and B are illustrated separately. Regardless of whether a plurality of unnecessary components are overlapped or separated, each of an idea and a basic concept of this embodiment is the same, and each of a method of calculating a gain distribution and a method of reducing the unnecessary component is also the same.

FIG. 2 illustrates a captured image which is generated by "imaging without pupil division". In this captured image, for simplicity, a fine object is omitted, and a part in gray as a background (including an object) and two squares (unnecessary components A and B) horizontally disposed that indicate ghosts (unnecessary components with higher luminances than that of each of the object and the background) appear. In reality, objects are somewhat transparent at the background of these unnecessary components. The unnecessary component corresponds to unnecessary light on a captured object, and thus has luminance higher than that of the captured object. Therefore, it is illustrated with a higher luminance than the gray part corresponding to the background. This is true also in other embodiments described below.

FIG. 1 (A-1) and FIG. 1 (B-1) illustrate a pair of parallax images which are obtained as a result of the photoelectric conversion of the light beams passing through the regions P1 and P2 (pupil regions) by the pixel groups G1 and G2. A difference (parallax component of an object) corresponding to a parallax of an image component exists between the pair of parallax images. However, for simplifying descriptions, the parallax component is omitted. The pair of parallax images contain the unnecessary components A and B schematically illustrated as white squares with uniform luminances, and the luminances are different from each other between the parallax images. In this embodiment, as described above, the example in which the unnecessary components A and B are separated without overlapping with each other is illustrated, but instead, these may overlap with each other to have a luminance difference. In other words, positions or luminances of the unnecessary component may be different from each other between the parallax images.

FIG. 1 (A-2) and FIG. 1 (B-2) illustrate luminance cross section of the pair of parallax images along the horizontal direction at the vicinity of the center in the vertical direction. Numerical values in graphs of FIG. 1 (A-2) and FIG. 1 (B-2) are luminance values of the unnecessary components. For example, in FIG. 1 (A-2), a luminance value at the background is 70, and both luminance values of the unnecessary components A and B are 130. FIG. 1 (C-1) illustrates an image (synthesized parallax image) obtained by adding and synthesizing the images of FIG. 1 (A-1) and FIG. 1 (B-1). FIG. 1 (C-2) illustrates a luminance cross section of the synthesized parallax image along the horizontal direction at the vicinity of the center in the vertical direction. This synthesized parallax image is equivalent to the captured image of FIG. 2 generated by the "imaging without pupil division". In this embodiment, by adding and synthesizing the pair of parallax images, a brightness (luminance) that is equivalent to that of the captured image generated by the "imaging without pupil division" is obtained. Instead, an image pickup apparatus which is capable of obtaining a brightness (luminance) that is equivalent to that of the captured image generated by the "imaging without pupil division" by averaging (adding and averaging) the pair of parallax images may be used. This case will be described in Embodiment 3 below.

FIG. 1 (D-1) illustrates an image obtained by subtracting the image of FIG. 1 (B-1) from the image of FIG. 1 (A-1) with respect to the pair of parallax images. FIG. 1 (D-2) illustrates a luminance cross section along the horizontal direction at the vicinity of the center in the vertical direction. Similarly, FIG. 1 (E-1) illustrates an image obtained by subtracting the image of FIG. 1 (A-1) from the image of FIG. 1 (B-1) with respect to the pair of parallax images. FIG. 1 (E-2) illustrates a luminance cross section along the horizontal direction at the vicinity of the center in the vertical direction. In this case, for simplifying the processing, when the difference value indicates a negative value, processing of truncating the negative value to be replaced with zero is performed. As a result, all values in the difference image illustrated in FIG. 1 (E-1) indicate zero.

FIG. 1 (F-1) is an image obtained by adding and synthesizing the image of FIG. 1(D-1) and FIG. 1 (E-1). Accordingly, a synthesized difference image illustrated in FIG. 1 (F-1) corresponds to an image obtained by removing the object and the background from the image of FIG. 1 (C-1), and it indicates only an unnecessary component contained in the image of FIG. 1 (C-1). As described above, by performing the difference calculation with respect to each parallax image, only the unnecessary component is maintained (that is, separated or extracted) and he unnecessary component can be determined.

In this embodiment, in order to calculate the image of FIG. 1 (F-1), as described above, the difference calculations are performed twice before the addition synthesis processing, and alternatively, a calculation of obtaining an absolute value of the difference may be performed to obtain an equivalent result as represented by expression (1) below.

$$Fig1F1(x,y)=|Fig1A1(x,y)-Fig1B1(x,y)| \quad (1)$$

In expression (1), symbols $Fig1F1(x,y)$, $Fig1A1(x,y)$, and $Fig1B1(x,y)$ represent luminance values at each coordinate in the image of FIG. 1 (F-1), FIG. 1 (A-1), and FIG. 1 (B-1), respectively. As a result, the result (image) of FIG. 1 (F-1) can be obtained by a single calculation.

FIG. 1 (F-1) is an image (first unnecessary component image) relating to the determined unnecessary component. While the "first unnecessary component" is created by adding and synthesizing the difference images to be one image as illustrated in FIG. 1 (F-1) for simplifying descriptions, the difference images are separated as an "unnecessary component image (1-1)" and an "unnecessary component image (1-2)", respectively, so that next calculation processing is to be performed separately. Processing described below is to be performed based on the determined unnecessary component. In this embodiment, the first unnecessary component is not necessarily stored as a so-called "image" that is to be displayed later so that a user can view it. The first unnecessary component image only needs to be usable as numerical data during the processing flow.

Next, correction processing of removing or reducing the unnecessary component determined as described above is performed on an image to be output. If the correction processing of removing or reducing the unnecessary component is performed without considering a "gain distribution" described below, FIG. 1 (F-1) as the first unnecessary component image may be subtracted simply from the image of FIG. 1 (C-1). FIG. 1 (G-1) illustrates an unnecessary component reduction image obtained by subtracting the components of FIG. 1 (F-1) from FIG. 1 (C-1) without considering the "gain distribution". As a result, an image in which the unnecessary component has been reduced compared to a captured image generated by the "imaging without pupil division" is obtained as illustrated in FIG. 1 (C-1). As can be seen in this example, however, when an optical path of the ghost is not completely separated into the regions P1 and P2 and the light beam passes through both the regions P1 and P2 at a certain ratio, the unnecessary component is not completely removed and accordingly, as illustrated in FIG. 1 (G-1), the unnecessary component remains in the unnecessary component reduction image.

When one unnecessary component only remain, reduction processing may be performed after a gain is applied uniformly to the first unnecessary component image (FIG. 1 (F-1)) until the unnecessary component can be sufficiently removed. For example, a case in which only the unnecessary component A contained in FIG. 1 (C-1) is to be sufficiently removed will be considered. The luminance value of the unnecessary component A is 240, and it is greater by 100 than 140 as the luminance value of the background. Since the luminance value of the unnecessary component A contained in the current first unnecessary component image (FIG. 1 (F-1)) is 20, the gain-up may be performed (specifically, generally five times of the luminance values of the first unnecessary component image) and then the first unnecessary component image of FIG. 1 (F-1) may be subtracted from the image of FIG. 1 (C-1).

As illustrated in FIG. 1, however, when a plurality of unnecessary components are contained and a reduction rate is different for each unnecessary component as illustrated in a graph of FIG. 1 (G-2), the unnecessary components cannot be removed by the simple gain-up processing. The reduction rate R(x,y) means a value calculated by expression (2) below for each pixel. In expression (2), symbols G1(x,y) and C1(x,y) represent luminance values of FIG. 1 (G-1) and FIG. 1 (C-1) at each coordinate, respectively. When a denominator is zero, the reduction rate at the coordinate is zero.

$$R(x,y)=1-\{G1(x,y)/C1(x,y)\} \qquad (2)$$

While the unnecessary component is illustrated as a square with a uniform luminance value for simplicity in this embodiment, in reality, the reduction rate is different for each pixel. The reduction rate illustrated in FIG. 1 (G-2) is indicated by using percentage (%) corresponding to a value obtained by multiplying the result of expression (2) by 100. FIG. 1 (G-2) means that the unnecessary component A is reduced by 8.3% compared to a captured image generated by the "imaging without pupil division" and the unnecessary component B is reduced by 18.2% compared to the captured image.

Figure 8:
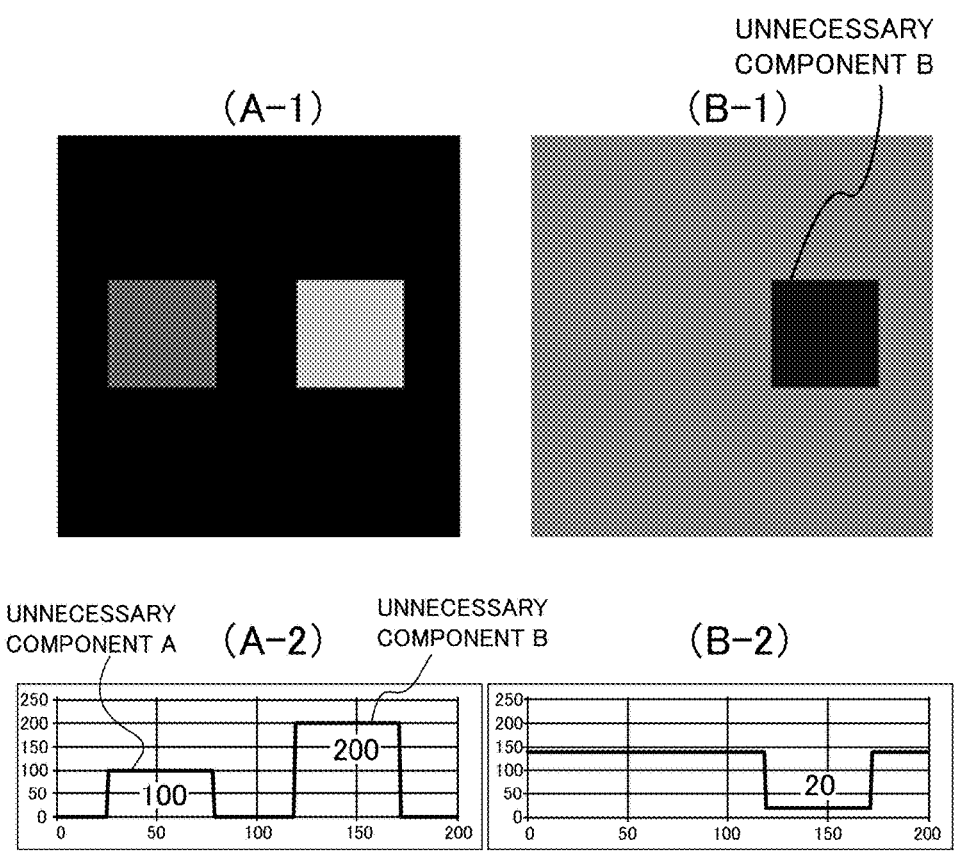
FIG. 8 is exemplary output images obtained by the image processing method in each of Embodiments 1 and 2.

While only the unnecessary component A is described thus far, hereinafter, the unnecessary component B is also targeted by using the same calculation. FIG. 8 is an example of output images obtained by the image processing method in this embodiment, and it illustrates images relating to the unnecessary component B. FIG. 8 (A-1) is a result of multiplying the luminance values of the first unnecessary component image entirely five times in order to remove the unnecessary component A sufficiently as described above. FIG. 8 (A-2) is a luminance cross section along the horizontal direction at the vicinity of the center in the vertical direction. FIG. 8 (B-1) is a result of subtracting the image of FIG. 8 (A-1) from the image of FIG. 1 (C-1), and FIG. 8 (B-2) is a luminance cross section along the horizontal direction at the vicinity of the center in the vertical direction.

When the image of FIG. 8 (B-1) is seen, the unnecessary component B is overcorrected and the dark level depression occurs while a region in which the unnecessary component A originally existed and has been removed is buried by the background luminance. Thus, when the plurality of unnecessary components exist and the reduction rates are different for each unnecessary component, the unnecessary components cannot be removed by the simple gain-up processing. When the plurality of unnecessary components with different reduction rates from each other exist in an image, an application of a uniform gain in accordance with a luminance value of any one of the unnecessary components results in overcorrection or shortage of correction for other unnecessary components. Accordingly, a good reduction result for all the unnecessary components cannot be obtained by the uniform gain adjustment.

In order to solve the problem, this embodiment creates a gain distribution in an image and changes a gain in the image based on the created gain distribution, instead of adjusting a gain uniformly in the image. Accordingly, a plurality of unnecessary components with different reduction rates can be effectively reduced.

In this embodiment, while the reduction rate is calculated by using a ratio, as a method of further simply calculating the reduction rate, the processing of obtaining the difference between the luminance values of FIG. 1 (G-1) and FIG. 1 (C-1) may be only performed. To be exact, it is different from the ratio calculation in a behavior occurring when a gain is applied, but similarly, there is a tendency that the black level depression of the unnecessary component (unnecessary light component) after the reduction processing can be suppressed.

Next, as an example of a method of creating the gain distribution, a method of creating the gain distribution based on the first unnecessary component image will be described. Steps in the method until the first unnecessary component image (FIG. 1 (F-1)) is calculated from the parallax images are the same as those in the method described above. Subsequently, with respect to a luminance value L (x,y) of the first unnecessary component image at each coordinate, as represented by expression (3) below, a gain distribution gain (x,y) at a two-dimensional coordinate (x,y) is calculated. In expression (3), symbols α and β are parameters.

$$\text{gain}(x, y) = \alpha \times \left(\frac{1}{L(x, y)}\right)^\beta \quad (3)$$

The concept of creating the gain distribution is to prevent the occurrence of the dark level depression caused by the reduction of the unnecessary component with a high reduction rate too much due to the gain applied to effectively reduce the unnecessary component with a low reduction rate. Accordingly, it is preferred that the gain applied to the unnecessary component with the high reduction rate is suppressed to be lower than that of each of the other unnecessary components. Since a part in which the luminance value is relatively high in the first unnecessary component image is subtracted from the parallax image by a value greater than that in another part, it can be estimated as a part with a higher reduction rate. Accordingly, as represented by expression (3), the gain is set to be relatively low in the part with the high luminance value in the first unnecessary component image, and on the other hand the gain is set to be relatively high in the part with the low luminance in the first unnecessary component image.

Figure 9:
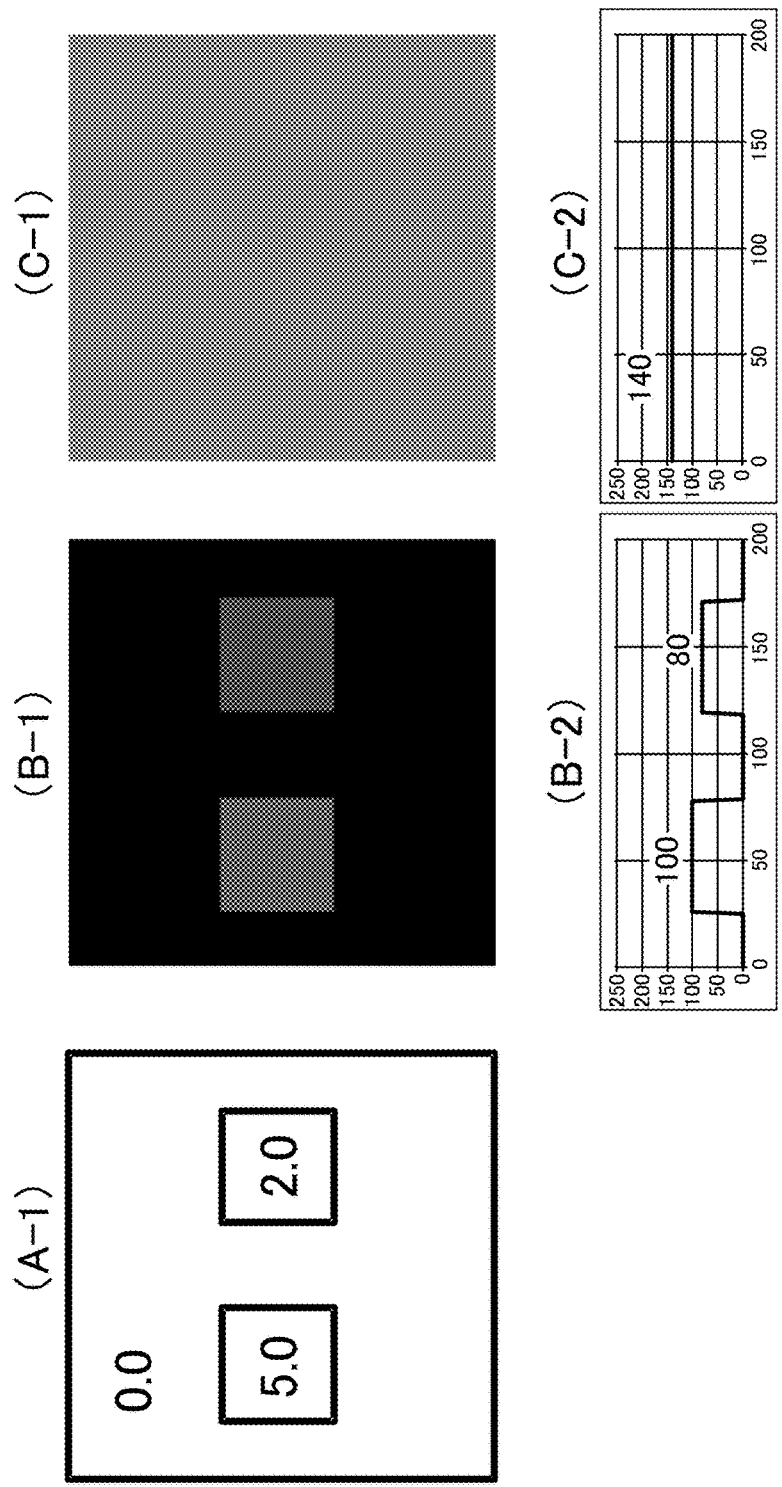
FIG. 9 is exemplary output images obtained by the image processing method in each of Embodiments 1 and 2.

FIG. 9 (A-1) illustrates the gain distribution in this embodiment. In this case, parameters α and β are as follows.
α=262.324
β=1.322

In this embodiment, a method of calculating the parameters α and β is not specifically limited. Even in the same unnecessary component, the brightness (luminance) of the unnecessary component varies depending on a light source or an image capturing condition. A reduction rate of the unnecessary component also changes depending on each lens, and accordingly to be exact, the values of the parameters α and β change depending on a condition at the time of capturing an image. Accordingly, they may be automatically obtained by adaptive processing by using a conventional method, or alternatively a value of 1 as an initial value may be assigned to each of the parameters α and β so that a user can adjust an image by inputting a numerical value or using a slider during the reduction processing while seeing a degree of the reduction of the unnecessary component (unnecessary light).

Subsequently, as represented by expression (4) below, the gain distribution gain (x,y) is multiplied by the luminance value L(x,y) of the first unnecessary component image to determine the unnecessary component intensity I(x,y). By imaging the unnecessary component intensity, a second unnecessary component image is obtained.

$$I(x,y) = \text{gain}(x,y) \times L(x,y) \quad (4)$$

FIG. 9 (B-1) illustrates the second unnecessary component image calculated by expression (4). FIG. 9 (B-2) illustrates a luminance cross section along the horizontal direction at the vicinity of the center in the vertical direction. Since the concept of creating the gain distribution is as described above, the method of creating the gain distribution is not limited to expression (2) if it matches the concept. FIG. 9 (C-1) illustrates an image obtained by subtracting the second unnecessary component image (FIG. 9 (B-1)) from the image of FIG. 1 (C-1). FIG. 9 (C-2) illustrates a luminance cross section along the horizontal direction at the vicinity of the center in the vertical direction. As illustrated in FIG. 9 (C-1) and FIG. 9 (C-2), both of unnecessary components A and B are effectively reduced.

In this embodiment, for the convenience of explanation, while the image as a second unnecessary component image is created, in actual processing, the second unnecessary component image does not need to be created and stored as a so-called "image" that can be displayed for a user later. The second unnecessary component image may be numerical data which can be used during the processing, and accordingly the unnecessary component intensity may be determined based on the first unnecessary component image and the gain distribution and a reduction image may be created by performing reduction processing.

Figure 10:
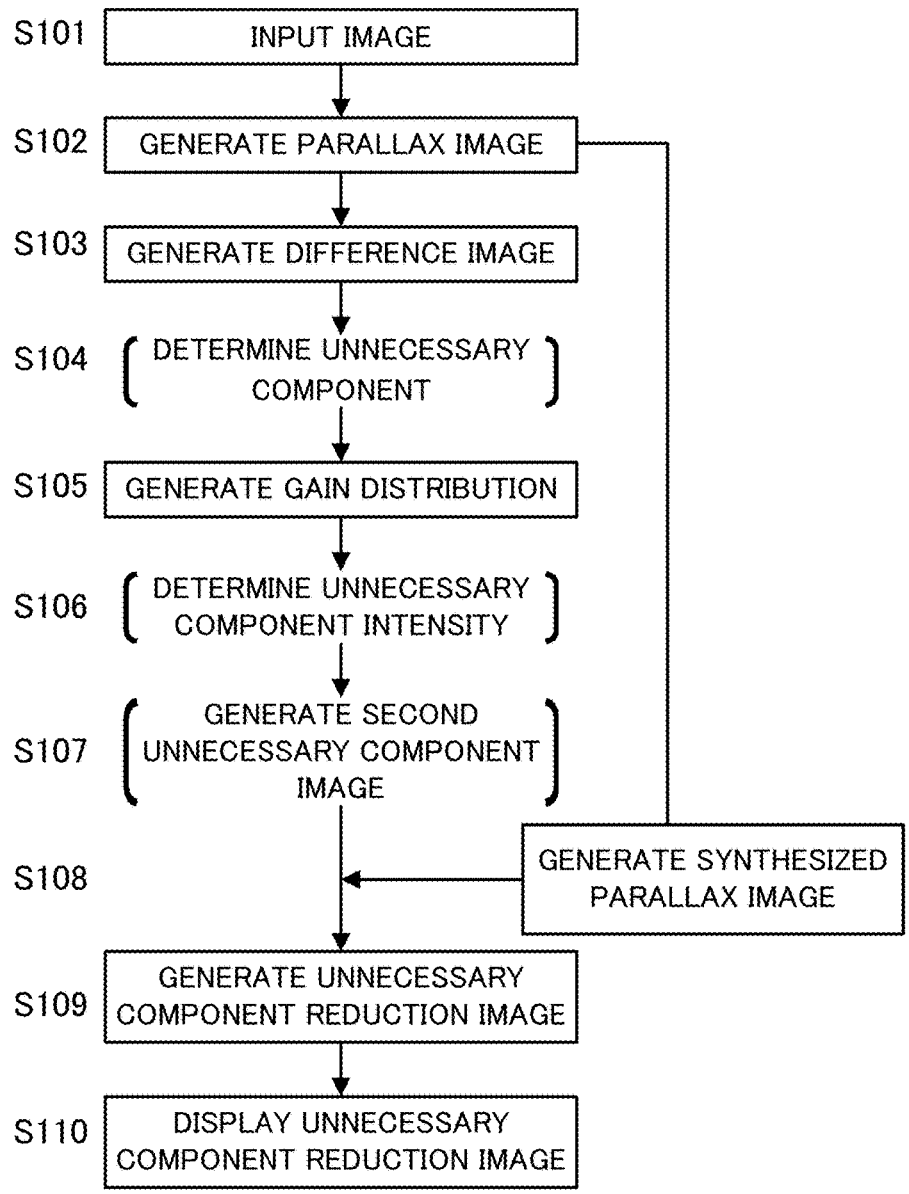
FIG. 10 is a flowchart of illustrating an image processing method in Embodiment 1.

Next, referring to FIG. 10, the image processing method (determination processing of the unnecessary component and reduction processing of the unnecessary component) in this embodiment will be described. FIG. 10 is a flowchart of illustrating the image processing method. Each step in FIG. 10 is performed by the system controller 210 or the image processor 204 according to an image processing program as a computer program.

First, at step S101, the system controller 210 controls an image pickup device that is constituted by the optical system 201 and the image pickup element 202 to photograph an object (capture an object image). The image processor 204 acquires a captured image as an input image.

Subsequently, at step S102, the image processor 204 generates a pair of parallax images by using digital signals which are output from the image pickup element 202 (pixel groups G1 and G2) and are obtained by the A/D conversion of the A/D converter 203. In this embodiment, the image processor 204 may perform typical development processing and various kinds of image correction processing to generate the parallax images.

Subsequently, at step S103, the image processor 204 (unnecessary component detector 204a) obtains difference information of the pair of parallax images. In other words, the image processor 204 generates a difference image of FIG. 1 (D-1) obtained by subtracting the image of FIG. 1 (B-1) from the image of FIG. 1 (A-1) and a difference image of FIG. 1 (E-1) obtained by subtracting the image of FIG. 1 (A-1) from the image of FIG. 1 (B-1). In such a simple difference calculation, difference values of the unnecessary components indicate positive values or negative values. For example, in this embodiment, when the image of FIG. 1 (B-1) is subtracted from the image of FIG. 1 (A-1) to generate the difference image of FIG. 1 (D-1), luminance values of the unnecessary component contained in FIG. 1 (A-1) are larger than luminance values of the unnecessary component contained in FIG. 1 (B-1). Accordingly, the difference values indicate positive values. Similarly, when the image of FIG. 1 (A-1) is subtracted from the image of FIG. 1 (B-1), the difference values indicate negative values. In this embodiment, for simplifying the unnecessary component reduction processing described below, processing of truncating the negative values to be zero is performed. Accordingly, all luminance values of an image of FIG. 1 (E-1) indicate zero.

When difference information is obtained with respect to an image including a close-range object, processing to align the positions of the pair of parallax images may be performed in order to remove an object parallax component while a display of the parallax component is omitted in this embodiment. The alignment can be performed by determining a shift position at which a correlation between the pair of parallax images is maximized while shifting a position of one of the parallax images relative to a position of the other of the parallax images. Alternatively, the alignment may be performed by determining the shift position at which the sum of squares of the difference between the parallax images is minimized. An in-focus area in the parallax image may be used to determine the shift position for the alignment.

An edge detection may be previously performed in each of the parallax images to determine the shift position for the alignment using an image containing the detected edge. According to this method, an edge with a high contrast is detected in the in-focus area, and on the other hand an out-of-focus area such as a background has a low contrast and is not easily detected as an edge, and thus the shift position is inevitably determined with the in-focus area being emphasized. Furthermore, a step of performing threshold processing or the like in order to remove the influence of a noise or the like may be added.

Subsequently, at step S104, the image processor 204 (unnecessary component detector 204a) determines a component remaining in the difference image obtained at step S103 as an unnecessary component. An image corresponding to the unnecessary component is referred to as a first unnecessary component image. Specifically, by adding and synthesizing an image of FIG. 1 (D-1) and an image of (FIG. 1 (E-1)), only a difference value of the unnecessary components contained in the images of FIG. 1 (A-1) and FIG. 1 (B-1) is detected as positive values. The unnecessary component detector 204a determines this as an unnecessary component, and it generates the first unnecessary component image (FIG. 1 (F-1)). However, the first unnecessary component image is not necessarily generated or stored as described above, and accordingly the difference image obtained at step S103 may be treated as an unnecessary component to improve a processing speed. In this case, step S104 is skipped and the flow proceeds to step S105 subsequent to step S103.

Subsequently, at step S105, the image processor 204 (gain distribution acquirer 204b) generates (determines) a gain distribution (for example, FIG. 9 (A-1)) based on the unnecessary component obtained at step S104.

Subsequently, at step S106, the image processor 204 (unnecessary component intensity determiner 204c) determines an unnecessary component intensity based on the unnecessary component determined at step S103 or step S104 and the gain distribution determined at step S105. Specifically, the unnecessary component intensity determiner 204c multiplies each luminance value of the first unnecessary component image by the gain distribution at each coordinate as represented by expression (4) to determine the unnecessary component intensity.

Subsequently, at step S107, the image processor 204 generates a second unnecessary component image (for example, an image of FIG. 9 (B-1)) based on the result at step S106. Since the unnecessary component intensity is determined by multiplying the difference image by the gain distribution, in this embodiment, the unnecessary component reduction processing may be performed without step S107. In this case, step S107 is skipped and step S108 is performed immediately after step S106.

Subsequently, at step S108, the image processor 204 generates an image (synthesized parallax image) which is equivalent to a captured image generated by "imaging without pupil division" according to addition synthesis processing of the parallax images. For example, by performing the processing to add the parallax image of FIG. 1 (A-1) generated at step S102 to the parallax image of FIG. 1 (B-1), the synthesized parallax image, illustrated in FIG. 1 (C-1), on which the addition synthesis processing has been performed is generated. Alternatively, at step S108, the synthesized parallax image may be generated by adding the digital signals which are output from the image pickup element 202 (pixel groups G1 and G2) and are obtained by the A/D conversion of the A/D converter 203 without the step (step S102) at which the parallax images are generated. Step S108 is not necessarily performed at this position, and the position at which this step is performed is not specifically limited as long as it is performed before step S109 so that the synthesized parallax image can be used at the next step S109.

Subsequently, at step S109, the image processor 204 (unnecessary component reducer 204d) performs correction processing to reduce or remove the unnecessary component from the synthesized parallax image generated at step S108. Specifically, the unnecessary component reducer 204d subtracts the image of FIG. 9 (B-1) from the image of FIG. 1 (C-1), and thus the unnecessary component can be reduced or removed. When the image of FIG. 9 (B-1) is not generated, the calculation of FIG. 1 (C-1)−{FIG. 1 (F-1)×FIG. 9(A-1)} may be directed performed. As a result, an unnecessary component reduction image is generated.

Finally, at step S110, the system controller 210 stores the output image in which the unnecessary component has been removed or reduced, i.e., unnecessary component reduction image (FIG. 9 (C-1)), in the image recording medium 209 or displays it on the display unit 205.

According to this embodiment, the unnecessary component which is formed by the unnecessary light (such as a ghost and a flare) from the difference image based on the plurality of parallax images obtained by a single image capturing (imaging) can be determined. In other words, the unnecessary component contained in a captured image can be determined without image capturing a plurality of times. Furthermore, even when a plurality of unnecessary components (such as ghosts or flares) that pass through pupil regions different from each other exist, the plurality of unnecessary components can be effectively reduced by determining the unnecessary component intensity based on the gain distribution. In this embodiment, for simplifying descriptions, an example of a gray scale image is described, and similarly it can be applied to a color image. In this case, the processing described above may be performed for each color channel independently, and finally each color may be synthesized to make one image.

Embodiment 2

Next, Embodiment 2 of the present invention will be described. This embodiment is different from Embodiment 1 with respect to the method of calculating the gain distribution. In this embodiment, a basic configuration of an image pickup apparatus is the same as that of the image pickup apparatus 200 of Embodiment 1 described referring to FIG. 5, and accordingly descriptions thereof will be omitted. An image processing method of this embodiment is different from the image processing method of Embodiment 1 only in the processing flow and the calculation method and the result of the image processing method is the same as that of Embodiment 1, and accordingly this embodiment will be described referring to FIG. 1 or FIG. 9.

Figure 11:
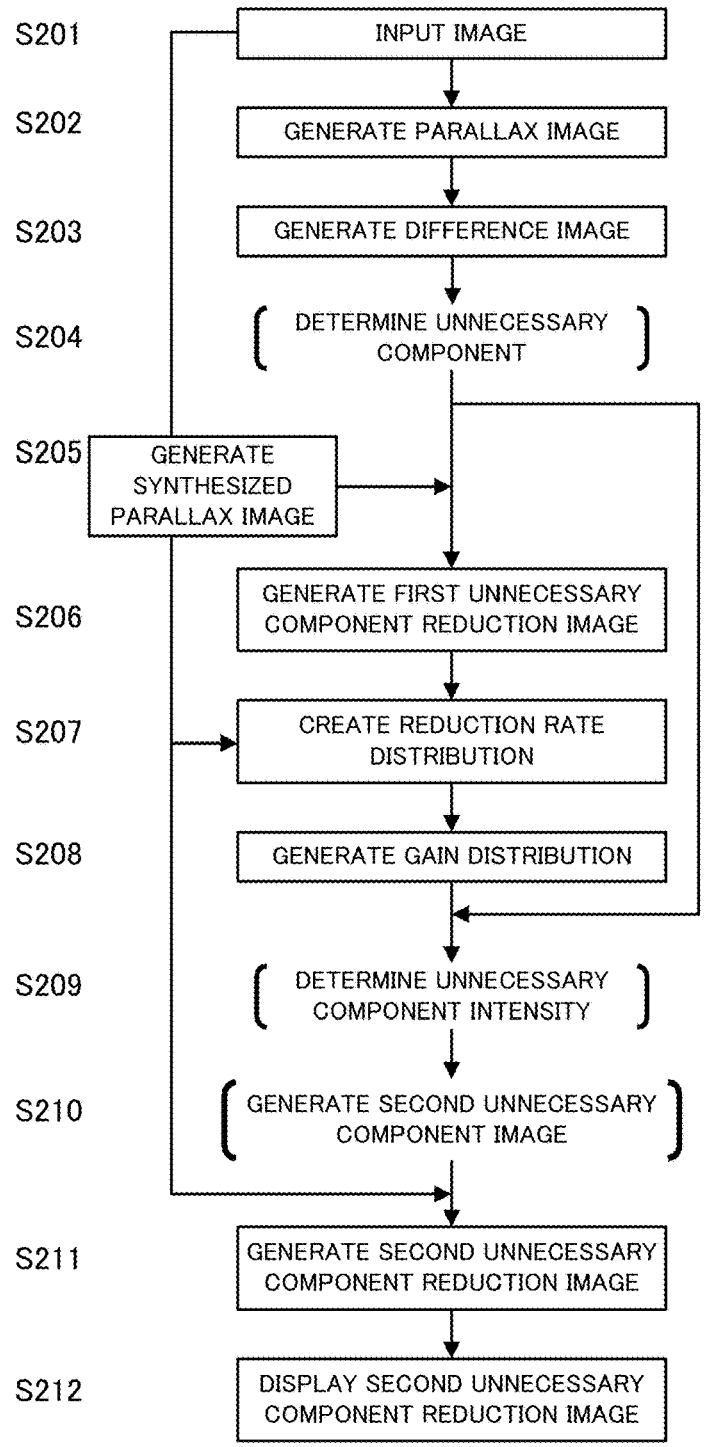
FIG. 11 is a flowchart of illustrating an image processing method in each of Embodiments 2 and 3.

Next, referring to FIG. 11, the image processing method (determination processing of the unnecessary component and reduction processing of the unnecessary component) in this embodiment will be described. FIG. 11 is a flowchart of illustrating the image processing method. Each step in FIG.

11 is performed by the system controller 210 or the image processor 204 according to an image processing program as a computer program.

In FIG. 11, steps S201 to S204 are the same as steps S101 to S104 of FIG. 10 in Embodiment 1, respectively. Subsequently, at step S205, the image processor 204 performs addition synthesis processing on the parallax images to generate an image (synthesized parallax image) which is equivalent to a captured image generated by "imaging without pupil division". In this embodiment, processing of adding the parallax images of FIG. 1 (A-1) and FIG. 1 (B-1) that are generated at step S202 is performed, and accordingly the synthesized image (synthesized parallax image) on which the addition synthesis processing has been performed is generated as illustrated in FIG. 1 (C-1). Alternatively, the image processor 204 may add digital signals which are output from the image pickup element 202 (pixel groups G1 and G2) and are obtained by the A/D conversion of the A/D converter 203 without step S205 to generate the synthesized parallax image.

Subsequently, at step S206, the image processor 204 generates a first unnecessary component reduction image based on the synthesized parallax image generated at step S205 and the unnecessary component (imaging of the unnecessary component corresponds to the first unnecessary component image) determined at step S204. Specifically, the image processor 204 subtracts the image of FIG. 1 (F-1) from the image of FIG. 1 (C-1) to acquire the first unnecessary component reduction image (FIG. 1 (G-1)).

Figure 12:
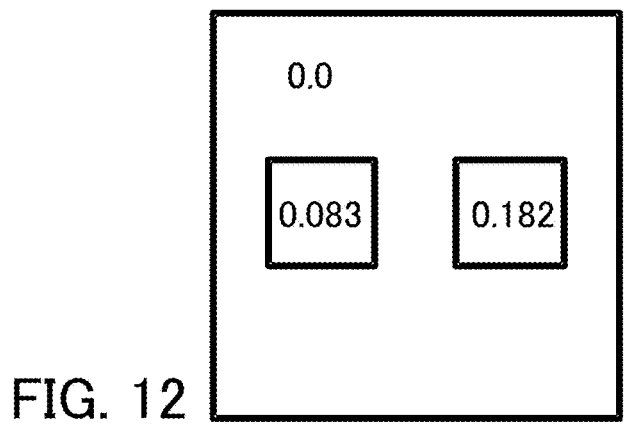
FIG. 12 is a diagram of illustrating a reduction rate distribution in Embodiment 2.

Subsequently, at step S207, the image processor 204 creates (calculates) the reduction rate distribution based on the synthesized parallax image generated at step S205 and the first unnecessary component reduction image generated at step S206. Specifically, the image processor 204 calculates the reduction rate represented by expression (2) described in Embodiment 1 for all pixels. When a denominator is zero, the reduction rate at the coordinate is zero. When a region in which the unnecessary component exists is known, the calculation may be performed only in the region in which the unnecessary component exists instead of performing the calculation for all the pixels. In this case, subsequent processing may be performed only in the region in which the unnecessary component exists, or all the reduction rates may be set to zero in regions other than the region in which the unnecessary component exists. As described above, as a method of further simply calculating the reduction rate, the processing of obtaining the difference between the luminance values of FIG. 1 (G-1) and FIG. 1 (C-1) may be only performed. To be exact, it is different from the ratio calculation in a behavior occurring when a gain is applied, but similarly, there is a tendency that the black level depression of the unnecessary component (unnecessary light component) after the reduction processing can be suppressed. FIG. 12 is the reduction rate distribution which is obtained by using FIG. 1 (C-1) and FIG. 1 (G-1) according to expression (2).

Subsequently, at step S208, the image processor 204 (gain distribution acquirer 204b) calculates the gain distribution based on the reduction rate distribution obtained at step S207. Specifically, the gain distribution acquirer 204b calculates the gain distribution gain(x,y) based on the reduction rate distribution R(x,y) for each coordinate (x,y) as represented by expression (5) below. In expression (5), symbols α and β are parameters.

$$\text{gain}(x, y) = \alpha \times \left(\frac{1}{R(x, y)}\right)^\beta \quad (5)$$

FIG. 9 (A-1) illustrates the gain distribution in this embodiment. Parameters α and β in this case are as follows.

α=0.270
β=1.174

In this embodiment, a method of calculating the parameters α and β is not specifically limited. Even in the same unnecessary component, the brightness (luminance) of the unnecessary component varies depending on an image capturing condition such as a light source. A reduction rate of the unnecessary component also changes depending on each lens. Thus, to be exact, the values of the parameters α and β change depending on a condition at the time of capturing an image. Accordingly, they may be automatically obtained by adaptive processing by using a conventional method, or alternatively a value of 1 as an initial value may be assigned to each of the parameters α and β so that a user can adjust an image by inputting a numerical value or using a slider during the reduction processing while seeing a degree of the reduction of the unnecessary component. Since the concept of creating the gain distribution is as described in Embodiment 1, the method of creating the gain distribution is not limited to expression (5) if it matches the concept.

Subsequently, at step S209, the image processor 204 (unnecessary component intensity determiner 204c) determines an unnecessary component intensity based on the unnecessary component determined at step S203 or step S204 and the gain distribution determined at step S208. Specifically, the unnecessary component intensity determiner 204c multiplies each luminance value of the first unnecessary component image by the gain distribution at each coordinate as represented by expression (4) to determine the unnecessary component intensity.

Subsequently, at step S210, the image processor 204 generates a second unnecessary component image (for example, FIG. 9 (B-1)) based on the result at step S209. Since the unnecessary component intensity is determined by multiplying the difference image by the gain distribution, in this embodiment, the unnecessary component reduction processing may be performed without step S210. In this case, step S210 is skipped and step S211 is performed immediately after step S209.

Subsequently, at step S211, the image processor 204 (unnecessary component reducer 204d) performs correction processing (generation processing of the second unnecessary component reduction image) to reduce or remove the unnecessary component from the synthesized parallax image generated at step S205. Specifically, the unnecessary component reducer 204d subtracts the image of FIG. 9 (B-1) from the image of FIG. 1 (C-1), and thus the unnecessary component can be reduced or removed. When the image of FIG. 9 (B-1) is not generated, the calculation of FIG. 1 (C-1)−{FIG. 1 (F-1)×FIG. 9(A-1)} may be directed performed. As a result, the second unnecessary component reduction image is generated.

Finally, at step S212, the system controller 210 stores the output image in which the unnecessary component has been removed or reduced, i.e., second unnecessary component reduction image (FIG. 9 (C-1)), in the image recording medium 209 or displays it on the display unit 205.

According to this embodiment, the unnecessary component which is formed by the unnecessary light (such as a ghost and a flare) from the difference image based on the plurality of parallax images obtained by a single image capturing can be determined. In other words, the unnecessary component contained in a captured image can be determined without image capturing a plurality of times. Furthermore, even when a plurality of unnecessary components (such as ghosts or flares) that pass through pupil regions different from each other exist, the plurality of unnecessary components can be effectively reduced by determining the unnecessary component intensity based on the gain distribution. In this embodiment, for simplifying descriptions, an example of a gray scale image is described, and similarly it can be applied to a color image. In this case, the processing described above may be performed for each color channel independently, and finally each color may be synthesized to make one image.

Embodiment 3

Next, Embodiment 3 (multiple pupil division) of the present invention will be described. This embodiment is different from each of Embodiments 1 and 2 in the number of parallaxes, the concept of parallax images, and the expression of calculating a gain distribution. In this embodiment, the basic configuration of an image pickup apparatus and the basic flow of an image processing method are the same as those in Embodiment 2, and accordingly descriptions thereof will be omitted.

Figure 13:
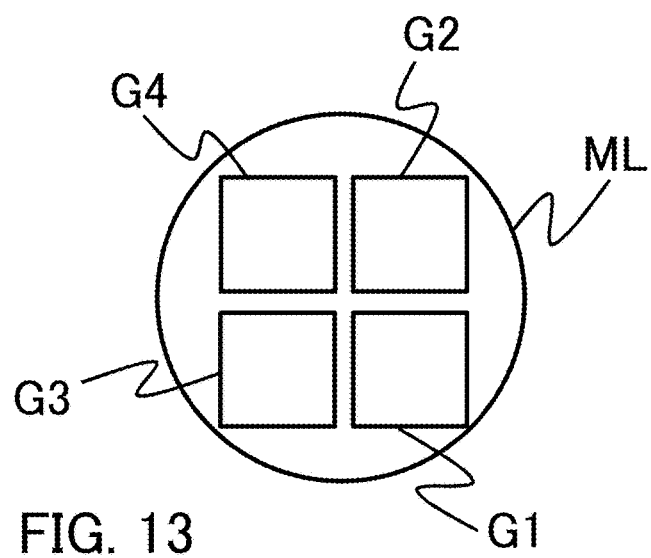
FIG. 13 is a diagram of illustrating an image pickup element in Embodiment 3.

FIG. 13 is a diagram of illustrating an image pickup element (light-receiving portion) in this embodiment. In FIG. 13, symbol ML represents a micro lens, and symbols G1, G2, G3, and G4 represent light-receiving portions (pixels), and one pixel G1, one pixel G2, one pixel G3, and one pixel G4 make a set. The image pickup element includes an array of a plurality of sets of the pixels G1, G2, G3, and G4. The set of pixels G1, G2, G3, and G4 have a conjugate relation with the exit pupil EXP via the shared (that is, provided for each pixel set) micro lens ML. In this embodiment, when an image which is equivalent to a captured image generated by "imaging without pupil division" is output, averaging processing (addition averaging processing) on signals obtained by the set of four pixels G1, G2, G3, and G4 are performed to generate one signal value.

In this embodiment, an example of a specific configuration of an optical system is also the same as that of the optical system 201 in Embodiment 1 described referring to FIGS. 6A to 6C, and accordingly descriptions thereof will be omitted. However, while the two unnecessary components A and B are contained as unnecessary components, an unnecessary component C, which is not illustrated in FIGS. 6A to 6C, is further contained in this embodiment.

Figure 14:
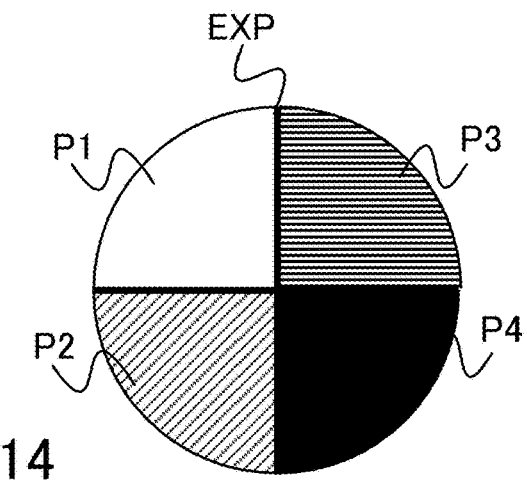
FIG. 14 is an explanatory diagram of unnecessary light passing through an aperture stop of the optical system in Embodiment 3.

FIG. 14 illustrates the regions P1, P2, P3, and P4 (pupil regions or pupil division regions) of the aperture stop STP, through which light beams incident on the pixels G1, G2, G3, and G4 illustrated in FIG. 13 pass. The aperture stop STP can be assumed to correspond to the exit pupil EXP (i.e. virtual image when seen from an image plane position of the optical system 201) of the optical system 201, but in practice, it is often the case that the aperture stop STP and the exit pupil EXP are different from each other. When a light beam from the high luminance object (SUN) passes through the aperture stop STP to be incident on each pixel, it is divided into the regions P1, P2, P3, and P4 (pupil regions).

Figure 15:
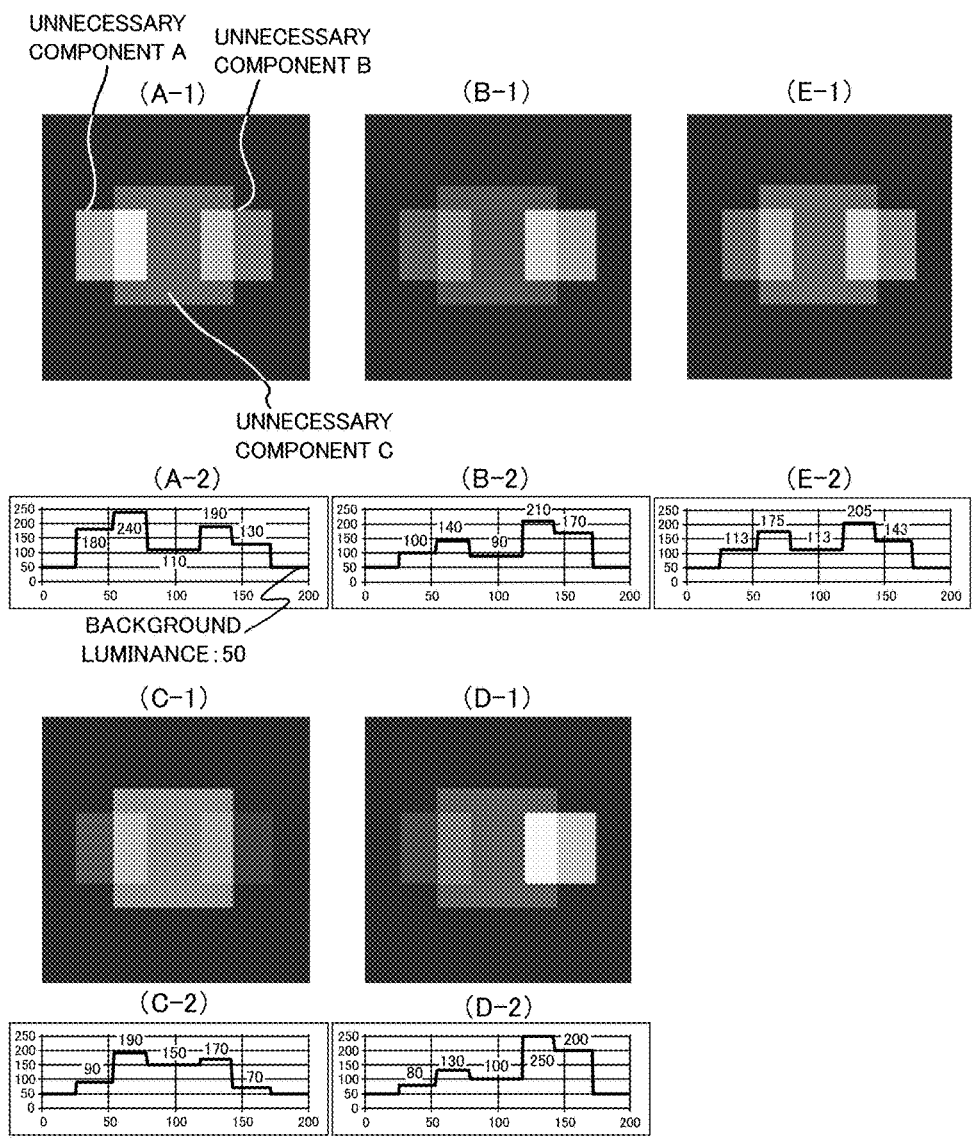
FIG. 15 is a diagram of illustrating a procedure of an image processing method in Embodiment 3.
Figure 16:
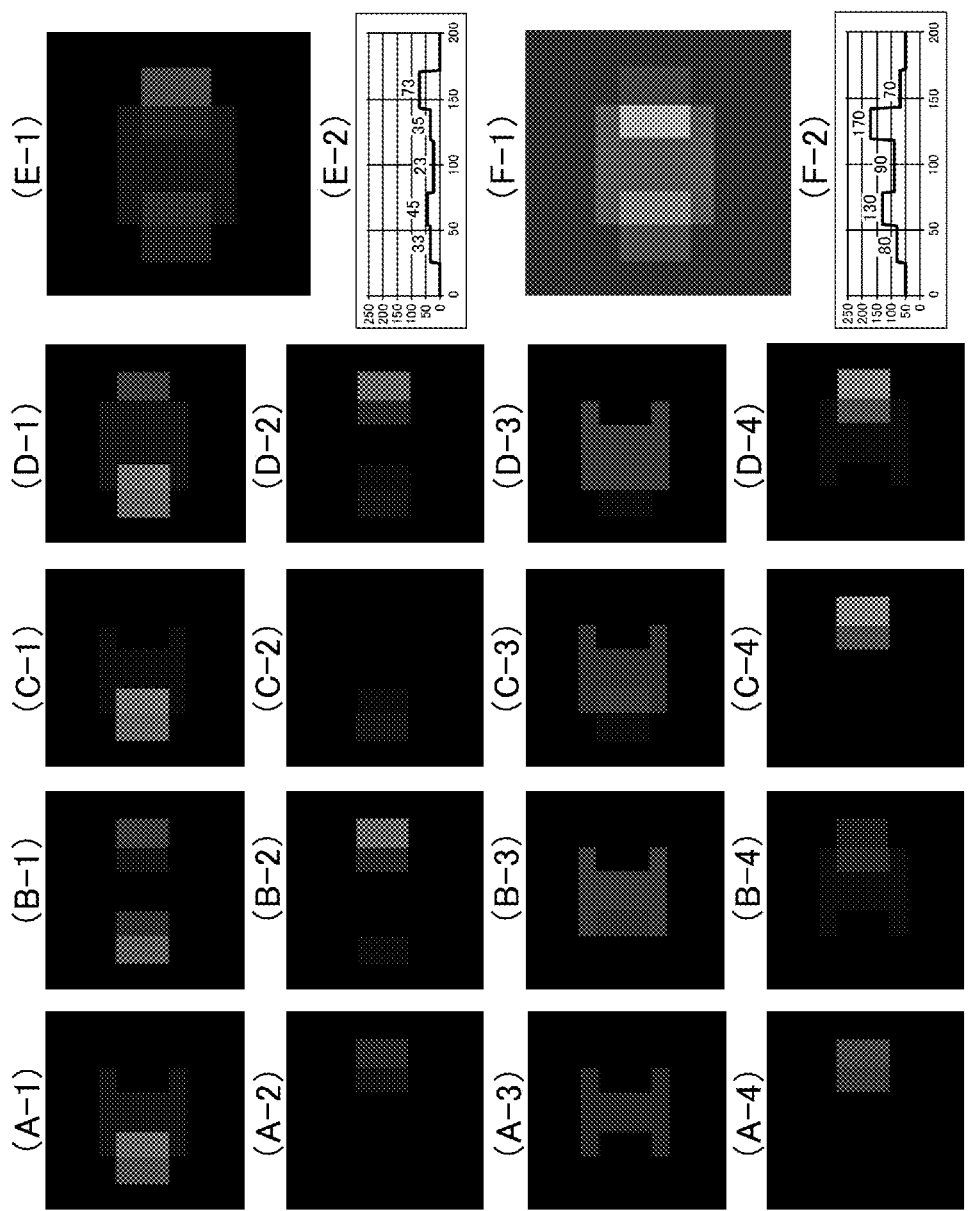
FIG. 16 is a diagram of illustrating a procedure of an image processing method in Embodiment 3.

Next, referring to FIGS. 15 and 16, a method of determining an unnecessary component as an image component that appears through a photoelectric conversion of unnecessary light in a captured image generated by the image pickup apparatus 200 will be described. FIGS. 15 and 16 are diagrams of illustrating a procedure of the image processing method in this embodiment.

FIG. 15 (A-1), FIG. 15 (B-1), FIG. 15 (C-1), and FIG. 15 (D-1) illustrate a set of parallax images which are obtained as a result of the photoelectric conversion of the light beams passing through the regions P1, P2, P3, and P4 (pupil regions) by the pixel groups G1, G2, G3, and G4, respectively. The set of parallax images contain the unnecessary components A, B, and C schematically illustrated as squares, which partially overlap with each other. Each of the unnecessary components of the parallax images are located at the same position in the parallax images of FIG. 15 (A-1), FIG. 15 (B-1), FIG. 15 (C-1), and FIG. 15 (D-1), and has a luminance different from each other. FIG. 15 (A-2), FIG. 15 (B-2), FIG. 15 (C-2), and FIG. 15 (D-2) illustrate luminance cross sections of the respective parallax images along the horizontal direction at the vicinity of the center in the vertical direction. A numerical value in a graph of each drawing indicates a luminance value of an unnecessary component. For example, in FIG. 15 (A-2), a luminance value at the background is 50, and luminance values of the unnecessary components A, B, and C are 180, 130, and 110, respectively. Apart where the unnecessary component overlaps indicates a value obtained by adding and synthesizing the luminance value of each of the overlapped unnecessary component and the luminance value of the background.

FIG. 15 (E-1) is an image obtained by performing the averaging processing (addition averaging processing) on the images of FIG. 15 (A-1), FIG. 15 (B-1), FIG. 15 (C-1), and FIG. 15 (D-1). Specifically, a luminance value of FIG. 15 (E-1) at each coordinate is calculated by adding luminance values of the images of FIG. 15 (A-1), FIG. 15 (B-1), FIG. 15 (C-1), and FIG. 15 (D-1) at each coordinate and then dividing the added luminance value by four. This is equivalent to a captured image generated by the "imaging without pupil division" in the image pickup apparatus of this embodiment. FIG. 15 (E-2) illustrates a luminance cross section of the image of FIG. 15 (E-1) along the horizontal direction at the vicinity of the center in the vertical direction.

FIG. 16 (A-1), FIG. 16 (B-1), and FIG. 16 (C-1) are difference images obtained by subtracting the images of FIG. 15 (B-1), FIG. 15 (C-1), and FIG. 15 (D-1), respectively, from the image of FIG. 15 (A-1) as a reference image with respect to the set of parallax images. Similarly to Embodiment 1, these parallax images contain the unnecessary components as difference information. Furthermore, similarly to Embodiment 1, while there are parts in which the unnecessary components contained in FIG. 16 (A-1), FIG. 16 (B-1), and FIG. 16 (C-1) are calculated as negative values by the difference calculation, for simplifying the unnecessary component reduction processing at the subsequent stage, the negative values are truncated to be zero. The same is true for all the other difference images. FIG. 16 (D-1) is information (maximum difference information or maximum difference image) obtained by extracting a maximum value between difference information at each pixel position in the difference images of FIG. 16 (A-1), FIG. 16 (B-1), and FIG. 16 (C-1) as difference information acquired as two-dimensional data.

FIG. 16 (A-2), FIG. 16 (B-2), and FIG. 16 (C-2) are difference images obtained by subtracting the images of FIG. 15 (A-1), FIG. 15 (C-1), and FIG. 15 (D-1), respectively, from the image of FIG. 15 (B-1) as the reference image with respect to the set of parallax images. FIG. 16 (D-2) is the maximum difference information between the difference information at each pixel position in the difference images of FIG. 16 (A-2), FIG. 16 (B-2), and FIG. 16 (C-2) as difference information acquired as two-dimensional data.

FIG. 16 (A-3), FIG. 16 (B-3), and FIG. 16 (C-3) are difference images obtained by subtracting the images of FIG. 15 (A-1), FIG. 15 (B-1), and FIG. 15 (D-1), respectively, from the image of FIG. 15 (C-1) as the reference image with respect to the set of parallax images. FIG. 16 (D-3) is the maximum difference information between the difference information at each pixel position in the difference images of FIG. 16 (A-3), FIG. 16 (B-3), and FIG. 16 (C-3) as difference information acquired as two-dimensional data.

FIG. 16 (A-4), FIG. 16 (B-4), and FIG. 16 (C-4) are difference images obtained by subtracting the images of FIG. 15 (A-1), FIG. 15 (B-1), and FIG. 15 (C-1), respectively, from the image of FIG. 15 (D-1) as the reference image with respect to the set of parallax images. FIG. 16 (D-4) is the maximum difference information between the difference information at each pixel position in the difference images of FIG. 16 (A-4), FIG. 16 (B-4), and FIG. 16 (C-4) as difference information acquired as two-dimensional data. The maximum difference information is a result obtained by extracting the unnecessary component from each parallax image.

Hereinafter, as described in Embodiments 1 and 2, the case in which the unnecessary component (imaging of the unnecessary component corresponds to the first unnecessary component image) is to determined is considered. In this case, as described above, the unnecessary component is extracted as maximum difference information for each parallax image, and accordingly it is considered that each of pieces of maximum difference information corresponds to the first unnecessary component image as a method. However, it is necessary to perform the subsequent processing as an image a number of times corresponding to the number of the parallax images, and thus the processing step is complicated. In order to solve the problem, in this embodiment, the subsequent processing is simplified by synthesizing each of pieces of the maximum difference information to one. Specifically, addition averaging processing is performed on the images of FIG. 16 (D-1), FIG. 16 (D-2), FIG. 16 (D-3), and FIG. 16 (D-4), and then the images are synthesized (combined). FIG. 16 (E-1) is a result of synthesizing the images, and FIG. 16 (E-2) is a luminance cross section along the horizontal direction at the vicinity of the center in the vertical direction. FIG. 16 (F-1) is an image obtained by subtracting FIG. 16 (E-1) as the first unnecessary component image from FIG. 15 (E-1) as the synthesized parallax image, and it corresponds to the first unnecessary component reduction image of FIG. 11 described in Embodiment 2. FIG. 16 (F-2) is a luminance cross section along the horizontal direction at the vicinity of the center in the vertical direction.

As described above, even when the number of parallaxes increases, "the synthesized parallax images" and "the first unnecessary component image" can be calculated. The flow of subsequent processing and the basic concept are the same as those of Embodiment 2, and accordingly, hereinafter, parts different from those of Embodiment 2 will be mainly described according to the processing flow of FIG. 11.

Figure 17:
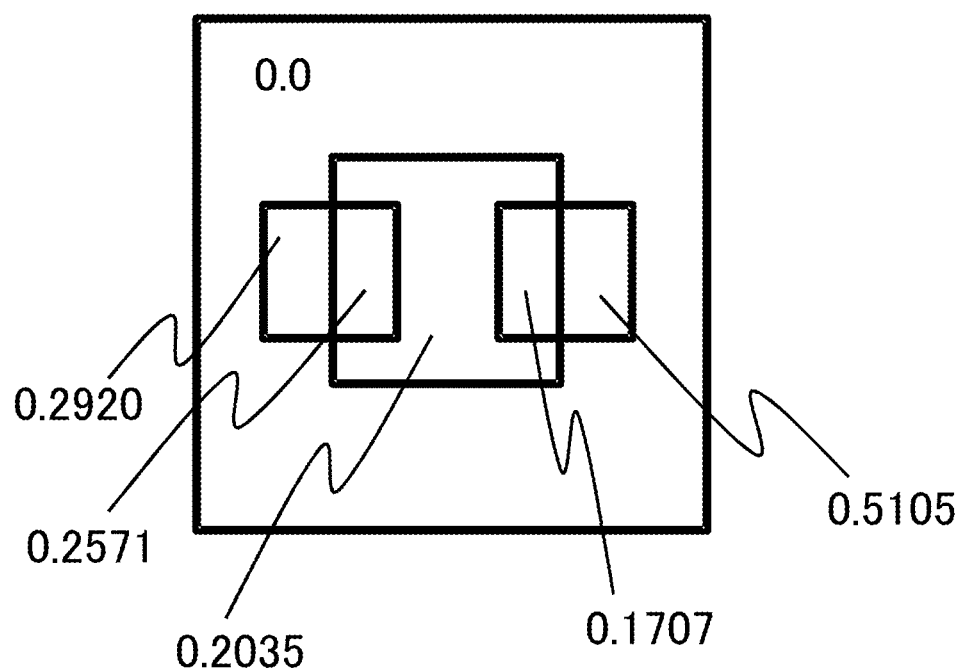
FIG. 17 is a diagram of illustrating a reduction rate distribution in Embodiment 3.

This embodiment is different from Embodiment 2 in the method of calculating the gain distribution at step S208. FIG. 17 is a diagram of illustrating the reduction rate distribution created (calculated) at step S207.

In this embodiment, the gain distribution gain(x,y) is calculated by using expression (6) below. In expression (6), symbol R(x,y) is the reduction rate distribution, and symbols A, B, C, D, and E are parameters.

$$\text{gain}(x, y) = A + B \times \left(\frac{1}{R(x, y)}\right)^1 + C \times \left(\frac{1}{R(x, y)}\right)^2 + D \times \left(\frac{1}{R(x, y)}\right)^3 + E \times \left(\frac{1}{R(x, y)}\right)^4 \quad (6)$$

The reduction rate R(x,y) is a value which is calculated by expression (7) below for each pixel, similarly to the way of thinking by expression (2). When a denominator is zero, the reduction rate at the coordinate is zero.

$$R(x,y)=1-\{F1(x,y)/E1(x,y)\} \quad (7)$$

In expression (7), symbols $F1(x,y)$ and $E1(x,y)$ represent luminance values at each coordinate in FIG. 16 (F-1) and FIG. 15 (E-1), respectively.

Figure 18:
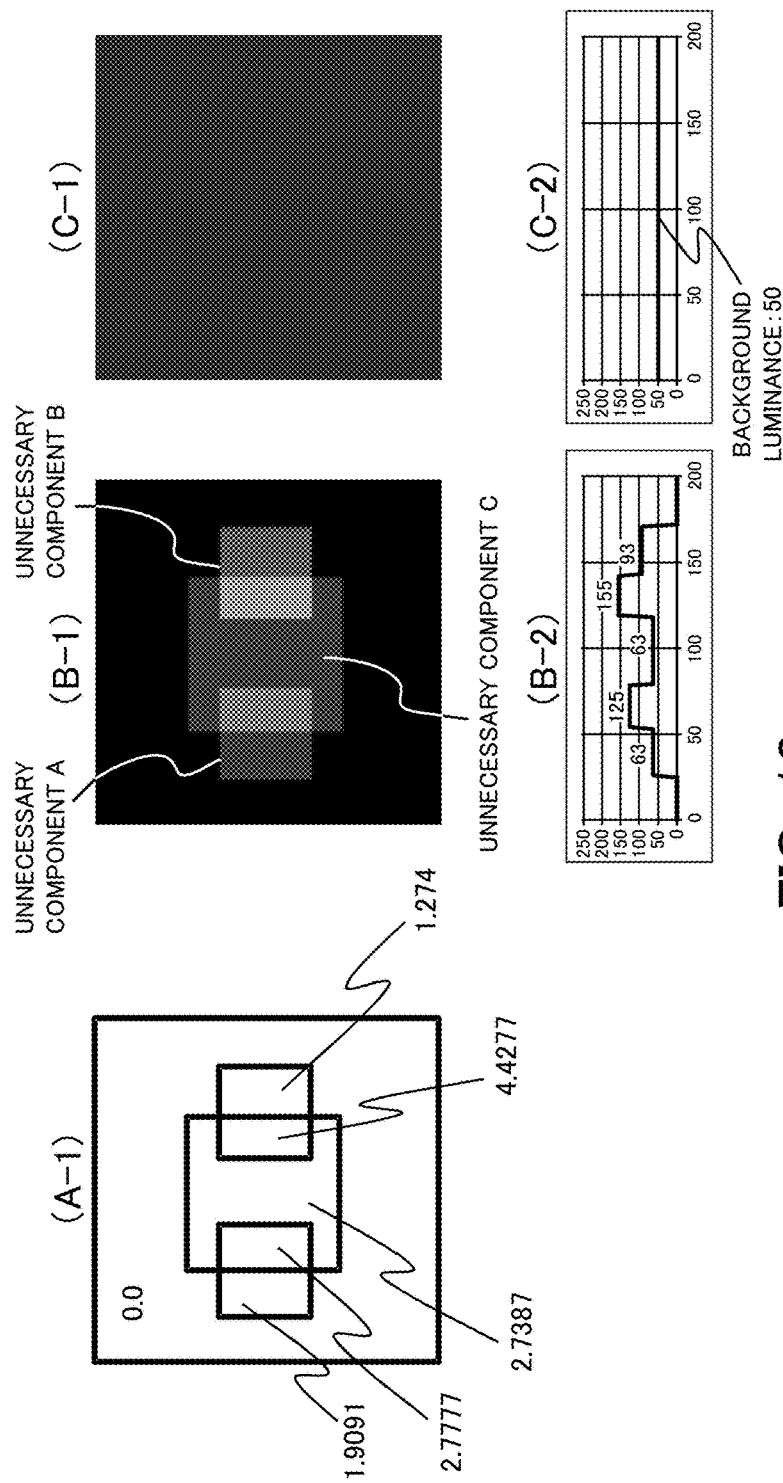
FIG. 18 is exemplary output images obtained by the image processing method in Embodiment 3.

FIG. 18 (A-1) illustrates the gain distribution in this embodiment. Parameters A, B, C, D, and E in this case are as follows.
A=75.69478
B=−88.7086
C=37.02509
D=−6.48479
E=0.408826

In this embodiment, a method of calculating the parameters A, B, C, D, and E is not specifically limited. Even in the same unnecessary component, the brightness (luminance) of the unnecessary component varies depending on an image capturing condition such as a light source. A reduction rate of the unnecessary component also changes depending on each lens. Thus, to be exact, the values of the parameters change depending on a condition at the time of capturing an image. Accordingly, they may be automatically obtained by adaptive processing by using a conventional method, or alternatively arbitrary values as initial values may be assigned to the respective parameters. The concept of creating the gain distribution is as described in Embodiments 1 and 2, and the method of creating the gain distribution is not limited to expression (6) if it matches the concept.

Subsequently, at step S209, the image processor 204 (unnecessary component intensity determiner 204c) determines an unnecessary component intensity based on the determined unnecessary component (first unnecessary component image) and the gain distribution. Specifically, the unnecessary component intensity determiner 204c multiplies the luminance value L(x,y) at each coordinate (x,y) in the first unnecessary component image by the gain (x,y) as represented by expression (4) to calculate the unnecessary component intensity I(x,y).

Subsequently, at step S210, the image processor 204 generates a second unnecessary component image (FIG. 18 (B-1)) based on the result at step S209. FIG. 18 (B-2) illustrates a luminance cross section along a horizontal direction at the vicinity of the center in a vertical direction of FIG. 18 (B-1). As described in Embodiments 1 and 2, steps S209 and S210 may be skipped and step S211 may be performed immediately after step S208.

Subsequently, at step S211, the image processor 204 (unnecessary component reducer 204d) performs correction processing (generation processing of the second unnecessary component reduction image) to reduce or remove the unnecessary component from the synthesized parallax image generated at step S205. Specifically, the unnecessary component reducer 204d subtracts the image of FIG. 18 (B-1) from the image of FIG. 15 (E-1), and thus the unnecessary component can be reduced or removed. When the image of FIG. 18 (B-1) is not generated, the calculation of FIG. 15 (E-1)–{FIG. 16 (E-1)×FIG. 18 (A-1)} may be directed performed.

Finally, at step S212, the system controller 210 stores the output image in which the unnecessary component has been removed or reduced, i.e., second unnecessary component reduction image (FIG. 18 (C-1)), in the image recording medium 209 or displays it on the display unit 205. FIG. 18 (C-2) illustrates a luminance cross section along a horizontal direction at the vicinity of the center in a vertical direction of FIG. 18 (C-1).

According to this embodiment, the unnecessary component which is formed by the unnecessary light (such as a ghost and a flare) from the difference image based on the plurality of parallax images obtained by a single image capturing can be determined. In other words, the unnecessary component contained in a captured image can be determined without image capturing a plurality of times. Furthermore, even when a plurality of unnecessary components (such as ghosts or flares) that pass through pupil regions different from each other exist, the plurality of unnecessary components can be effectively reduced by determining the unnecessary component intensity based on the gain distribution. In this embodiment, for simplifying descriptions, an example of a gray scale image is described, and similarly it can be applied to a color image. In this case, the processing described above may be performed for each color channel independently, and finally each color may be synthesized to make one image.

Embodiment 4

Next, Embodiment 4 of the present invention will be described. Ren. Ng et al., "Light Field Photography with a Hand-held Plenoptic Camera" (Stanford Tech Report CTSR 2005-2) discloses a "plenoptic camera". The "plenoptic camera" can acquire information of the position and angle of a light beam from an object by using a technique called "light field photography".

Figure 19:
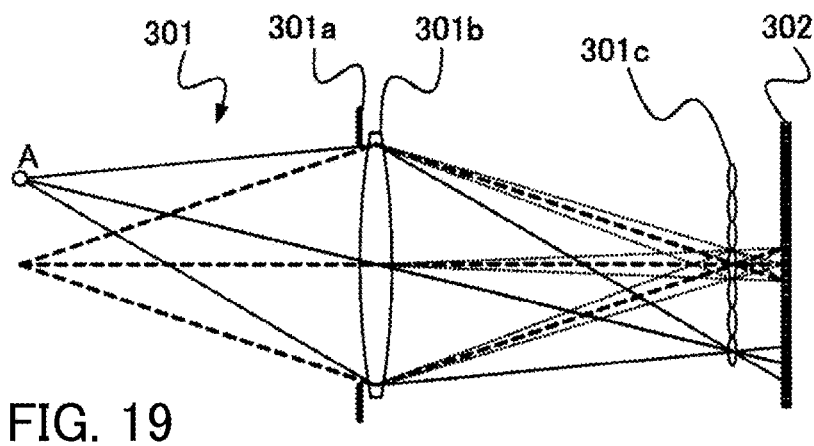
FIG. 19 is a diagram of illustrating an image pickup system in Embodiment 4.

FIG. 19 illustrates an image pickup system of an image pickup apparatus in this embodiment, and illustrates a configuration of the image pickup system of the "plenoptic camera". An optical system 301 (image pickup optical system) includes a primary lens (image pickup lens) 301b and an aperture stop 301a. A micro lens array 301c is disposed at an imaging position of the optical system 301, and an image pickup element 302 is disposed behind (closer to an image than) the micro lens array 301c. The micro lens array 301c has a function as a separator (separating member) that prevents a light beam passing through, for example, a point A in an object space from being mixed with a light beam passing through a point near the point A on the image pickup element 302. FIG. 19 illustrates that a top beam, a primary light beam, and a bottom beam from the point A are received by pixels different from each other. Thus, the light beams passing through the point A can be separately acquired depending on their angles.

Figure 20:
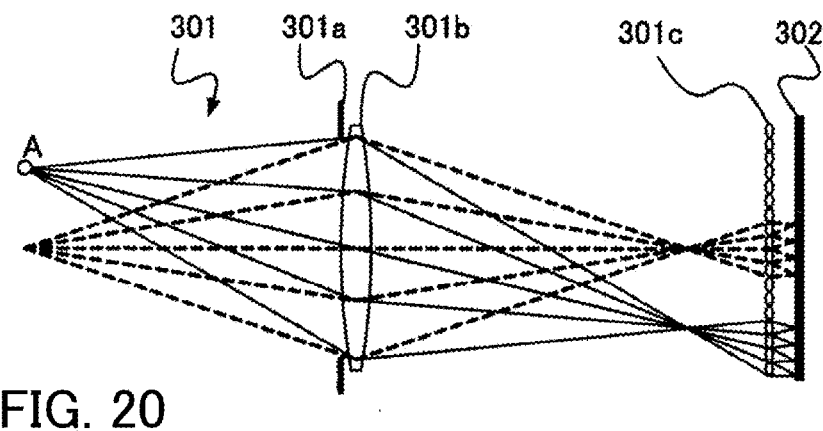
FIG. 20 is a diagram of illustrating an image pickup system in Embodiment 4.
Figure 21:
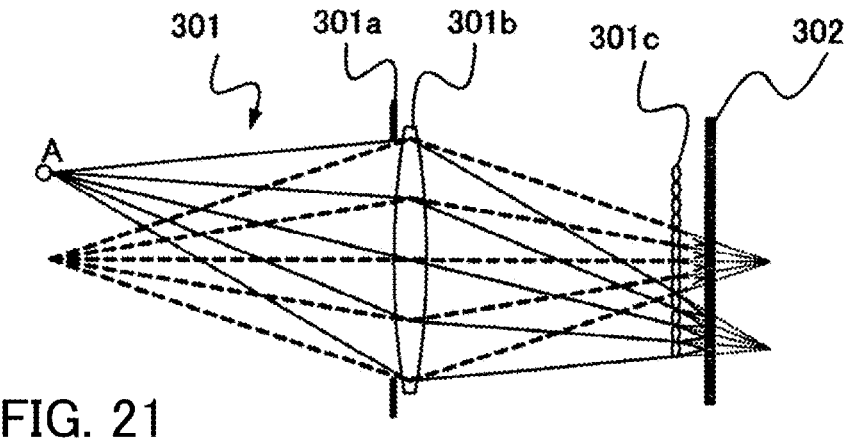
FIG. 21 is a diagram of illustrating an image pickup system in Embodiment 4.

Todor Georgive et al., "Full Resolution Light Field Rendering" (Adobe Technical Report January 2008) discloses configurations of an image pickup system illustrated in FIGS. 20 and 21 that acquire information (light field) of the position and angle of a light beam.

Figure 22:
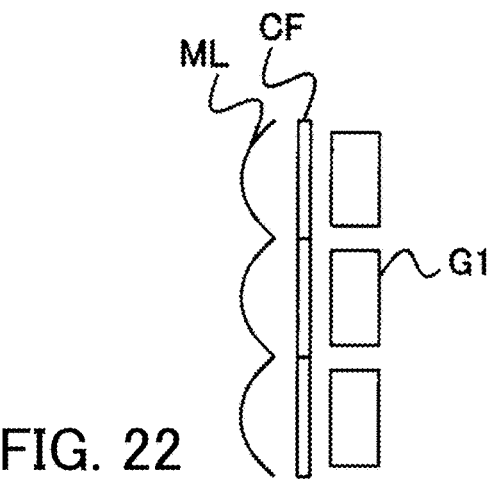
FIG. 22 is a diagram of illustrating a conventional image pickup element.

With the configuration of the image pickup system illustrated in FIG. 20, the micro lens array 301c is disposed behind (closer to an image than) the imaging position of the primary lens 301b to reimage the light beams passing through the point A on the image pickup element 302, thereby separately acquiring the light beams depending on their angles. With the configuration of the image pickup system illustrated in FIG. 21, the micro lens array 301c is disposed in front of (closer to an object than) the imaging position of the primary lens 301b to image the light beams passing through the point A on the image pickup element 302, thereby separately acquiring the light beams depending on their angles. In both configurations, light beams passing through a pupil of the optical system 301 are separated depending on passed regions (passed positions) in the pupil. In these configurations, the image pickup element 302 may employ a conventional image pickup element including one micro lens ML and one light-receiving portion G1 that are paired via a color filter CF as illustrated in FIG. 22.

Figure 23A:
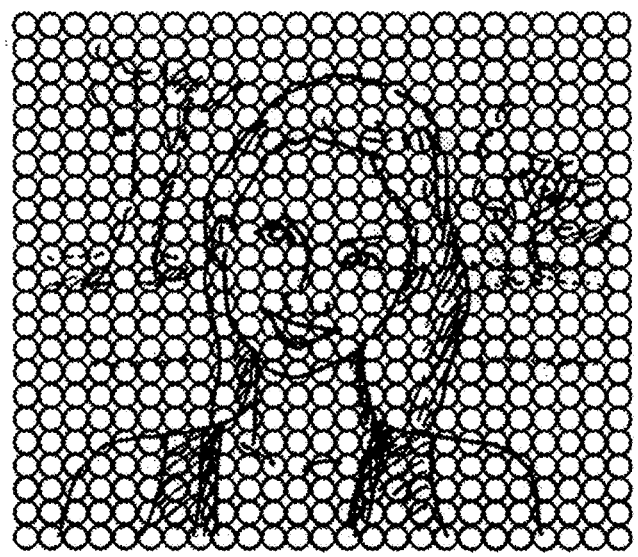
FIGS. 23A and 23B are diagrams of illustrating images obtained through the image pickup system in FIG. 19.
Figure 23B:
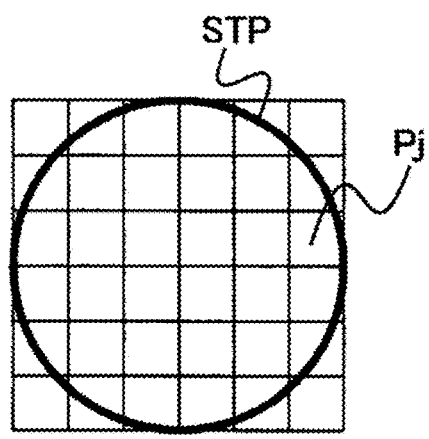
Figure 24:
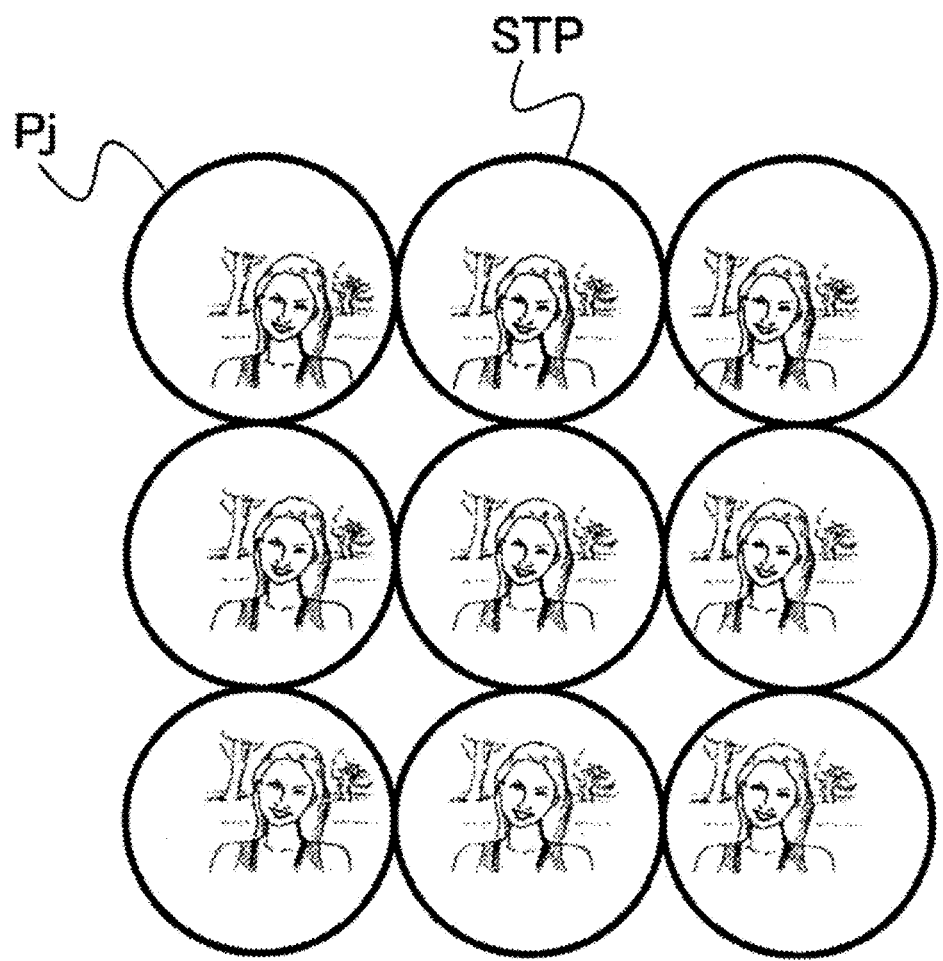
FIG. 24 is a diagram of illustrating images obtained through the image pickup system in each of FIGS. 20 and 21.

The optical system 301 illustrated in FIG. 19 yields an image as illustrated in FIG. 23A. FIG. 23B is an enlarged view of one of arrayed circles in FIG. 23A. One circle represents the aperture stop STP, and an inside thereof is divided by a plurality of pixels Pj (j=1, 2, 3, . . . ). This configuration allows the intensity distribution of the pupil within one circle to be acquired. The optical system 301 illustrated in FIGS. 20 and 21 are used to obtain parallax images illustrated in FIG. 24. The parallax images as illustrated in FIG. 24 may be obtained by rearranging and reconstructing the pixels Pj in the circles (aperture stops STP) in an image illustrated in FIG. 23A.

As described in Embodiment 1 to 3, unnecessary light such as ghost passes through the pupil with biased distribution across the pupil. Thus, the image pickup apparatus in this embodiment that performs image pickup through divided regions of the pupil may employ the image processing methods described in Embodiment 1 to 3 to determine unnecessary components and further reduce them.

In another example, parallax images are obtained by capturing images of an identical object through a plurality of cameras as illustrated in FIG. 25. Thus, these cameras may employ the image processing methods described in Embodiment 1 to 3. C1, C2, and C3 represent separate image pickup apparatuses, but they may be regarded as a single image pickup apparatus that performs image pickup through three divided regions of a large pupil. Alternatively, as illustrated in FIG. 26, the pupil division may be achieved by providing one image pickup apparatus with a plurality of optical systems OSj (j=1, 2, 3, . . . ).

Each of the embodiments describes the image pickup apparatus that performs the image processing method of each embodiment (is provided with the image processing apparatus), but the image processing method of each embodiment may be performed by an image processing program installed in a personal computer. In this case, the personal computer corresponds to the image processing apparatus of each embodiment. The personal computer takes in (acquires) an image (input image) generated by the image pickup apparatus and yet to be provided with image processing, and outputs an image obtained by performing the image processing by the image processing program.

In each embodiment, the image processing apparatus (image processor 204) includes the generator (unnecessary component detector 204a, or determiner) the gain distribution determiner (gain distribution acquirer 204b, or calculator), the intensity determiner (unnecessary component intensity determiner 204c), and the reducer (unnecessary component reducer 204d). The generator generates difference information relating to a plurality of parallax images.

The gain distribution determiner determines a gain distribution based on the difference information. The intensity determiner determines an unnecessary component intensity based on the gain distribution. The reducer generates an unnecessary component reduction image in which an unnecessary component is reduced based on the parallax image and the unnecessary component intensity.

Preferably, the reducer reduces the unnecessary component from a synthesized parallax image obtained by synthesizing the parallax images based on the unnecessary component intensity to generate the unnecessary component reduction image (S109, S211). Preferably, the generator determines an unnecessary component based on the difference information (S104, S204). Then, the gain distribution determiner determines the gain distribution based on the unnecessary component. More preferably, the generator generates an image (first unnecessary component image) relating to the unnecessary component. Then, the gain distribution determiner determines the gain distribution (as represented by expression (3)) depending on a luminance value L(x,y) of the image (first unnecessary component image). More preferably, the intensity determiner determines the unnecessary component intensity I(x,y) based on the gain distribution and the luminance value of the image (as represented by expression (4)).

Preferably, the generator determines a reduction rate distribution R(x,y) based on the parallax image and the unnecessary component. Then, the gain distribution determiner determines the gain distribution depending on the reduction rate distribution. More preferably, the generator determines the reduction rate distribution based on the parallax image and the difference information (S206, S207).

Preferably, the difference information is obtained by setting each of the plurality of parallax images as a reference image and calculating a difference between the reference image and a parallax image other than the reference image. Preferably, the difference information is obtained by calculating an absolute value of a difference between two parallax images. Preferably, the plurality of parallax images are images generated based on light beams passing through regions different from each other in a pupil of an optical system.

As a modification of each embodiment, the image processing apparatus (image processor 204) may include an unnecessary component determiner (unnecessary component detector 204a), a gain distribution determiner (gain distribution acquirer 204b), and a reducer (unnecessary component reducer 204d). The unnecessary component determiner generates difference information relating to a plurality of parallax images to determine an unnecessary component based on the difference information. The gain distribution determiner determines a gain distribution based on the unnecessary component. The reducer generates an unnecessary component reduction image in which an unnecessary component is reduced based on the parallax image, the unnecessary component, and the gain distribution.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, an image processing apparatus, an image pickup apparatus, an image processing method, and a non-transitory computer-readable storage medium which are capable of effectively determining an intensity of an unnecessary component contained in a captured image without imaging a plurality of times to reduce the unnecessary component from the captured image can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-039964, filed on Mar. 2, 2015, which is hereby incorporated by reference herein in its entirety.

What is claimed is:

1. An image processing apparatus comprising:
a generator configured to generate difference information relating to a difference in a luminance value between a plurality of parallax images;
a gain distribution determiner configured to determine a gain distribution depending on a reduction rate distribution determined based on the plurality of parallax images and the difference information generated by the generator;
an intensity determiner configured to determine an intensity of an unnecessary component based on a product of the gain distribution and the difference information, the unnecessary component corresponding to a ghost or a flare; and
a reducer configured to generate an output image by reducing, using the intensity of the unnecessary component, the unnecessary component from a synthesized image obtained by synthesizing the plurality of parallax images.

2. The image processing apparatus according to claim 1, wherein the gain distribution determiner is configured to determine the gain distribution using the unnecessary component, which is determined based on the difference information.

3. The image processing apparatus according to claim 2, wherein the gain distribution determiner is configured to determine the gain distribution depending on a luminance value of an image generated using the unnecessary component.

4. The image processing apparatus according to claim 3, wherein the intensity determiner is configured to determine the intensity of the unnecessary component based on the gain distribution and the luminance value.

5. The image processing apparatus according to claim 1, wherein the difference information is obtained by setting each of the plurality of parallax images as a reference image and calculating a difference between the reference image and a parallax image other than the reference image.

6. The image processing apparatus according to claim 1, wherein the difference information is obtained by calculating an absolute value of a difference between two parallax images contained in the plurality of parallax images.

7. The image processing apparatus according to claim 1, wherein the plurality of parallax images are generated based on light beams passing through regions different from each other in a pupil of an optical system.

8. An image pickup apparatus comprising:
an image pickup device configured to photoelectrically convert an optical image formed via an optical system to output a plurality of parallax images; and
the image processing apparatus according to claim 1.

9. The image pickup apparatus according to claim 8, wherein:
the plurality of parallax images are generated based on light beams passing through regions different from each other in a pupil of the optical system,
the image pickup device includes a plurality of pixels sharing a single micro lens, and
the plurality of pixels are configured to receive the light beams passing through the regions different from each other in the pupil of the optical system.

10. The image pickup apparatus according to claim 8, wherein the plurality of parallax images are generated by guiding light beams passing through regions different from each other in a pupil of the optical system to pixels of the image pickup device different from each other.

11. An image processing method comprising the steps of:
generating difference information relating to a difference in luminance value between a plurality of parallax images;
determining a gain distribution depending on a reduction rate distribution determined based on the plurality of parallax images and the difference information;
determining an intensity of an unnecessary component based on a product of the gain distribution and the difference information, the unnecessary component corresponding to a ghost or a flare; and
generating an output image by reducing, based on the intensity of the unnecessary component, the unnecessary component from a synthesized image obtained by synthesizing the plurality of parallax images.

12. A non-transitory computer-readable storage medium storing a program executable by a computer to execute an image processing method comprising the steps of:
generating difference information relating to a difference in luminance value between a plurality of parallax images;
determining a gain distribution depending on a reduction rate distribution determined based on the plurality of parallax images and the difference information;
determining an intensity of an unnecessary component based on a product of the gain distribution and the difference information, the unnecessary component corresponding to a ghost or a flare; and
generating an output image by reducing, based on the intensity of the unnecessary component, the unnecessary component from a synthesized image obtained by synthesizing the plurality of parallax images.

13. An image processing apparatus comprising:
a generator configured to generate difference information relating to a difference in luminance value between a plurality of parallax images;
a gain distribution determiner configured to determine a gain distribution depending on a reduction rate distribution determined based on the plurality of parallax images and the difference information generated by the generator; and
a reducer configured to generate an output image by reducing, using a product of the difference information and the gain distribution, an unnecessary component from a synthesized image obtained by synthesizing the plurality of parallax images, the unnecessary component corresponding to a ghost or a flare.

14. An image pickup apparatus comprising:
an image pickup device configured to photoelectrically convert an optical image formed via an optical system to output a plurality of parallax images; and
the image processing apparatus according to claim 13.

15. An image processing method comprising the steps of:
generating difference information relating to a difference in luminance value between a plurality of parallax images;
determining a gain distribution depending on a reduction rate distribution determined based on the plurality of parallax images and the difference information; and
generating an output image by reducing, using a product of the difference information and the gain distribution, an unnecessary component from a synthesized image obtained by synthesizing the plurality of parallax images, the unnecessary component corresponding to a ghost or a flare.

16. A non-transitory computer-readable storage medium storing a program executable by a computer to execute an image processing method comprising the steps of:
generating difference information relating to a difference in luminance value between a plurality of parallax images;
determining a gain distribution depending on a reduction rate distribution determined based on the plurality of parallax images and the difference information; and
generating an output image by reducing, using a product of the difference information and the gain distribution, an unnecessary component from a synthesized image obtained by synthesizing the plurality of parallax images, the unnecessary component corresponding to a ghost or a flare.

17. An image processing apparatus comprising:
a generator configured to generate difference information relating to a difference between a plurality of parallax images;
a gain distribution determiner configured to determine a gain distribution depending on a luminance value of an image generated using the difference information and a reduction rate distribution determined based on the plurality of parallax images and the difference information;
an intensity determiner configured to determine an intensity of an unnecessary component based on the gain distribution and the luminance value of the image; and a reducer configured to generate an output image in which the unnecessary component is reduced based on the plurality of parallax images and the intensity of the unnecessary component.

18. An image processing method comprising the steps of:
generating difference information relating to a difference between a plurality of parallax images;
determining a gain distribution depending on a luminance value of an image generated using the difference information and a reduction rate distribution determined based on the plurality of parallax images and the difference information;
determining an intensity of an unnecessary component based on the gain distribution and the luminance value of the image; and
generating an output image in which the unnecessary component is reduced based on the plurality of parallax images and the intensity of the unnecessary component.

19. An image processing apparatus comprising:
a generator configured to generate difference information relating to a difference between a plurality of parallax images;
a gain distribution determiner configured to determine a gain distribution depending on a reduction rate distribution determined using the plurality of parallax images and the difference information;
an intensity determiner configured to determine an intensity of an unnecessary component based on the gain distribution; and
a reducer configured to generate an output image in which an unnecessary component is reduced based on the plurality of parallax images and the intensity of the unnecessary component.

20. An image processing method comprising the steps of:
generating difference information relating to a difference between a plurality of parallax images;
determining the gain distribution depending on a reduction rate distribution determined using the plurality of parallax images and the difference information;
determining an intensity of an unnecessary component based on the gain distribution; and
generating an output image in which an unnecessary component is reduced based on the plurality of parallax images and the intensity of the unnecessary component.

* * * * *